(12) United States Patent
Okada

(10) Patent No.: US 7,747,148 B2
(45) Date of Patent: Jun. 29, 2010

(54) SHAKE DETECTING APPARATUS, SHAKE CORRECTING APPARATUS AND IMAGE PICKUP APPARATUS

(75) Inventor: Hiroyuki Okada, Izumi (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 862 days.

(21) Appl. No.: 11/481,121

(22) Filed: Jul. 5, 2006

(65) Prior Publication Data

US 2007/0009242 A1 Jan. 11, 2007

(30) Foreign Application Priority Data

Jul. 6, 2005 (JP) ............................. 2005-197103

(51) Int. Cl.
*G03B 17/00* (2006.01)
*H04N 5/228* (2006.01)

(52) U.S. Cl. ..................................... 396/52; 348/208.1

(58) Field of Classification Search .................. 396/52, 396/55, 153; 348/208.99, 208.1, 208.2, 208.3, 348/208.6, 208.13
See application file for complete search history.

(56) References Cited

U.S. PATENT DOCUMENTS

2003/0035053 A1* 2/2003 Kyuma et al. ............ 348/208.2
2009/0021589 A1* 1/2009 Okada ..................... 348/208.1

FOREIGN PATENT DOCUMENTS

| JP | 08-82823 | 3/1996 |
| JP | 2004-228809 | 8/2004 |
| JP | 2005-151542 | 6/2005 |

* cited by examiner

*Primary Examiner*—Rodney E Fuller
(74) *Attorney, Agent, or Firm*—Brinks Hofer Gilson & Lione

(57) ABSTRACT

A shake detecting apparatus includes a shake detecting sensor for outputting signals resulting from shake given to the shake detecting apparatus. In the case of application, for example, to an image pickup apparatus, the shake detecting sensor detects camera shake given to the image pickup apparatus. The shake detecting apparatus further includes an first integrating section for integrating the signals outputted from the shake detecting sensor, a second integrating section for integrating outputs of the first integrating section, and a correcting section for correcting the outputs of the first integrating section using outputs of the second integrating section after the lapse of a specified period following a specified timing.

19 Claims, 15 Drawing Sheets

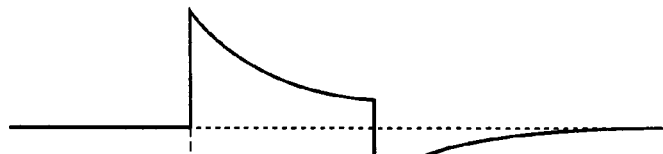
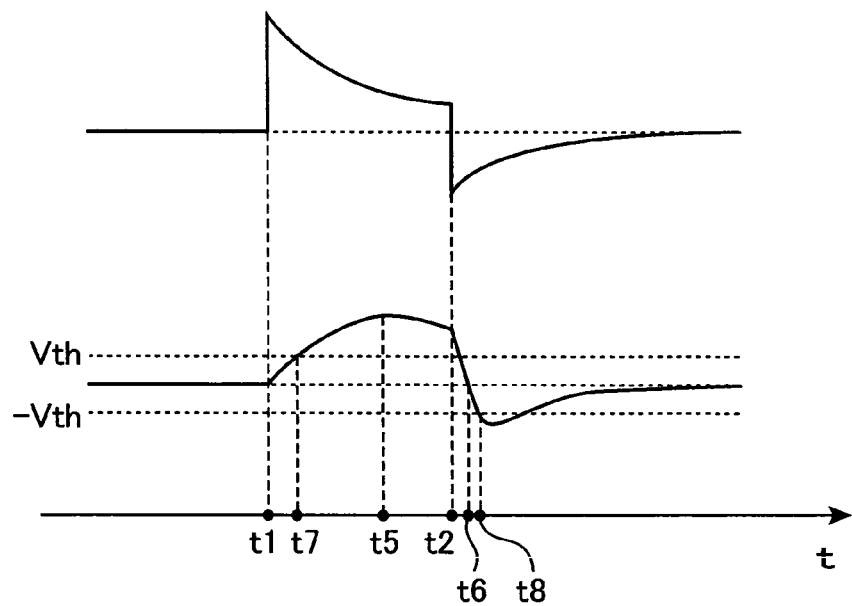

CORRECTION TIMING

SHAKE DETECTING APPARATUS, SHAKE CORRECTING APPARATUS AND IMAGE PICKUP APPARATUS

This application is based on patent application No. 2005-197103 filed in Japan, the contents of which are hereby incorporated by references.

BACKGROUND OF THE INVENTION

1. Field of the Invention

The present invention relates to an apparatus for detecting shake such as camera shake given, for example, to an electronic camera, and an apparatus for correcting a photographing optical system against the shake based on a shake detection result.

2. Description of the Background Art

There have been widely known image pickup apparatuses having a so-called camera-shake correcting function in order to enable secure photographing in cases where "shake" such as camera shake is likely to occur during the photographing by a telephoto lens or of an object in the dark (requiring a longer exposure) with the apparatuses hand-held. This camera-shake correcting function corrects a displacement of an optical axis by driving a shake-correcting optical system or an image pickup device based on shake in the case of the displacement of the optical axis resulting from the shake given to the image pickup apparatus, for example, due to the hand shake of a user.

In the image pickup apparatus having the camera-shake correcting function is provided a shake detecting sensor including, for example, a gyroscope for detecting a shake amount of the image pickup apparatus. A shake correction control unit calculates a shake angle of the image pickup apparatus by integrating outputs of the shake detecting sensor, and drives the shake-correcting optical system based on the shake angle information.

A detection output of the shake detecting sensor when the image pickup apparatus is stationary has a relatively large individual difference, and changes according to an environmental temperature. Thus, the shake detecting sensor is normally connected with an amplifier via a high-pass filter constructed by a capacitor and a resistance element so as to remove direct-current components from an output signal of the shake detecting sensor.

Japanese Unexamined Patent Publication No. H08-82823 discloses a camera having a shake correcting function of calculating a shake amount of the camera from an output signal of an angular velocity sensor and correcting a movement of an object image on a light receiving surface by driving a correcting optical system arranged on a light path of a photographing optical system based on the calculated shake amount. In this publication, direct-current cutting means for cutting direct-current components contained in an output voltage of the angular velocity sensor is comprised of subtracting means for subtracting a direct-current component voltage V3 from an output voltage V1 of the angular velocity sensor, direct-current detecting means for calculating the direct-current components based on an output voltage V2 of the subtracting means by an operation of (V3+V2/Kx), and setting means for setting a detection criterion of the direct-current detecting means by changing the coefficient Kx. This direct-current cutting means cuts up to relatively high frequency components by setting the coefficient Kx at a relatively small value K1 during a period until a light measurement switch is turned on after the camera is powered, continuously changes the coefficient Kx from the value K1 to a value K2 larger than K1 during a period until a specified time lapses after the light measurement switch is turned on, and cuts only relatively low frequency components by setting the coefficient Kx at the value K2 thereafter.

In the case of providing the high-pass filter constructed by the capacitor and the resistance element, an output signal of the shake detecting sensor comes to contain relatively more direct-current components, for example, when the image pickup apparatus is panned. As a result, the high-pass filter outputs a signal containing direct-current components with an opposite sign (however, attenuated by a time constant of the high-pass filter), whereby a wrong detection result (detection angle) is generated to lead to a reduction in shake correcting performance.

SUMMARY OF THE INVENTION

An object of the present invention is to provide a shake detecting apparatus, a shake correcting apparatus and an image pickup apparatus capable of preventing or suppressing a reduction in shake correcting performance.

In order to accomplish this object, one aspect of the invention is directed to a shake detecting apparatus, comprising a shake detecting sensor for outputting signals resulting from shake given to the shake detecting apparatus; a first integrating section for integrating the signals outputted from the shake detecting sensor; a second integrating section for integrating outputs of the first integrating section; and a correcting section for correcting the outputs of the first integrating section using outputs of the second integrating section after the lapse of a specified period from a specified timing.

Another aspect of the invention is directed to a shake correcting apparatus, comprising a photographing optical system for introducing an object image to an image pickup surface; a shake detecting sensor for outputting signals resulting from shake given to the shake correcting apparatus; a first integrating section for integrating the signals outputted from the shake detecting sensor; a second integrating section for integrating outputs of the first integrating section; a correcting section for correcting the outputs of the first integrating section using outputs of the second integrating section after the lapse of a specified period from a specified timing; a calculator for calculating a shake correction amount used to stabilize an optical axis of the photographing optical system based on the output of the first integrating section corrected by the correcting section, and an actuator for driving a shake correction object based on the calculated shake correction amount for the correction.

Still another aspect of the invention is directed to an image pickup apparatus, comprising an image pickup device; a photographing optical system for introducing an object image to the image pickup device; a shake detecting sensor for outputting signals resulting from shake given to the image pickup apparatus; a first integrating section for integrating the signals outputted from the shake detecting sensor; a second integrating section for integrating outputs of the first integrating section; a correcting section for correcting the outputs of the first integrating section using outputs of the second integrating section after the lapse of a specified period from a specified timing; a calculator for calculating a shake correction amount used to stabilize an optical axis of the photographing optical system based on the output of the first integrating section corrected by the correcting section, and an actuator for driving a shake correction object based on the calculated shake correction amount for the correction.

According to these aspects of the invention, when electrical signals resulting from shake given to the shake detecting apparatus (shake correction device, image pickup apparatus) are outputted from the shake detecting sensor, the electrical signals outputted from the shake detecting sensor are integrated by the first integrating section. Further, the outputs of the first integrating section are integrated by the second integrating section. The outputs of the first integrating section are corrected using the outputs of the second integrating section after the lapse of the specified period from the specified timing.

Thus, even if the output signals of the shake detecting sensor contain numerous direct-current components, the outputs of the first integrating section after the lapse of the specified period from the specified timing can be made true to actual shake. Therefore, a reduction in shake correction performance can be prevented or suppressed. As a result, a photographed image having no or less blurring can be obtained.

BRIEF DESCRIPTION OF THE DRAWINGS

FIGS. 4A and 4B are diagrams showing one exemplary construction of a shake correcting mechanism realizing a camera-shake correcting function, wherein FIG. 4A is a front view and a FIG. 4B is a section along IVB-IVB of FIG. 4A, FIG. 9A is a graph substantially similar to FIG. 6C, and FIG. 9B is a graph showing a change of an average value calculated by an average-value calculating section when the output of the first HPF changes as shown in FIG. 9A.

DESCRIPTION OF THE PREFERRED EMBODIMENTS

Figure 1:
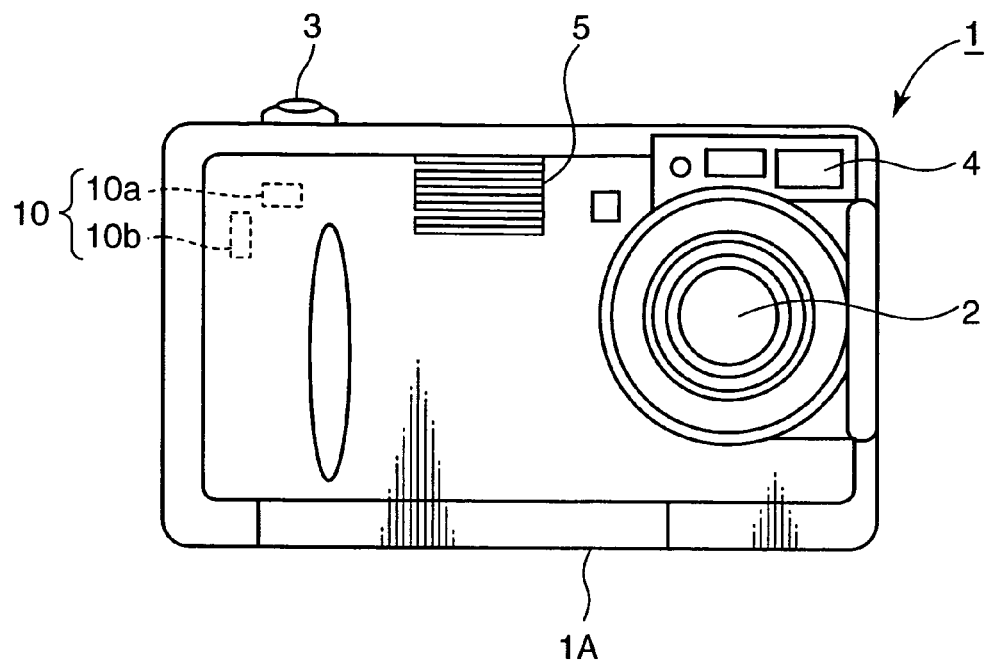
FIG. 1 is a front view showing the construction of a first embodiment of an image pickup apparatus according to the invention.
Figure 2:
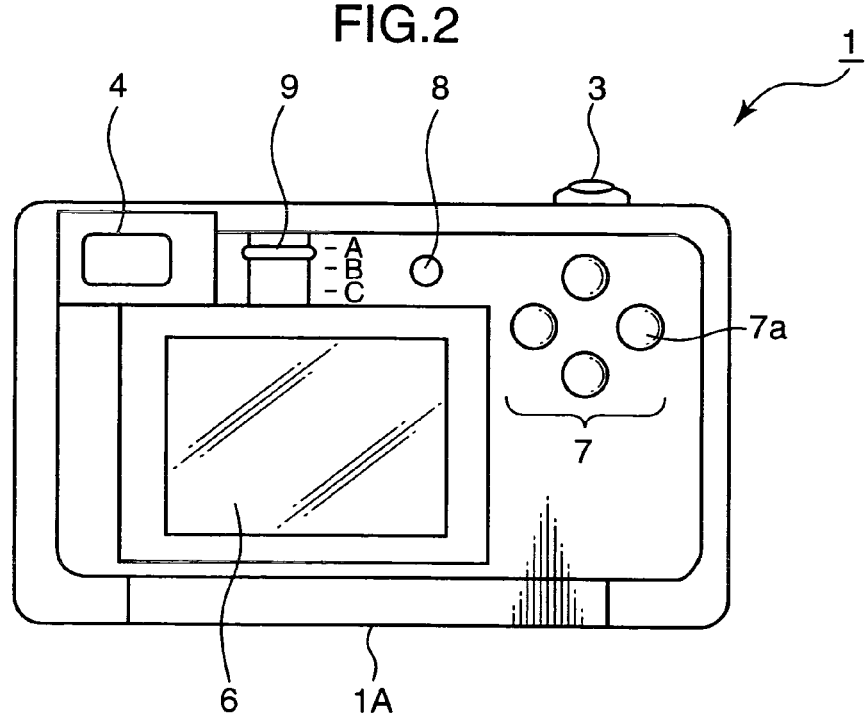
FIG. 2 is a rear view showing the construction of the image pickup apparatus.

Hereinafter, a first embodiment of an image pickup apparatus according to the present invention is described. FIG. 1 is a front view showing the construction of the first embodiment of the image pickup apparatus, and FIG. 2 is a rear view showing the construction of the image pickup apparatus. It should be noted that the same members and the like are identified by the same reference numerals in FIGS. 1 and 2.

As shown in FIGS. 1 and 2, the image pickup apparatus 1 of this embodiment is provided with an apparatus main body 1A, a photographing optical system 2, a shutter button 3, an optical viewfinder 4, a flash device 5, an LCD (liquid crystal display) 6, function switches 7, a power button 8, a mode setting switch 9 and a shake detecting sensor 10.

The photographing optical system 2 is arranged at a specified position on the front surface of the apparatus main body 1A for forming a light image of an object. The photographing optical system 2 includes a zoom lens group 12 (see FIG. 3) for changing a photographing field angle and a focusing lens group 13 (see FIG. 3) for focus adjustment, and is adapted to change a focal length and a focal position.

The shutter button 3 is a button operable in two steps (pressed halfway and pressed fully) and adapted to instruct a timing of an exposure control. The image pickup apparatus 1 has a still-image photographing mode for photographing a still image and a movie photographing mode for photographing moving images. In a state where the still-image photographing mode or the movie photographing mode is set and the shutter button 3 is not operated, images (live-view images) of an object are renewably displayed on the LCD 6 at every interval of a specified period, e.g. 1/30 (sec.).

Live-view images are images picked up by an image pickup device 14 and switchingly displayed on the LCD 6 at specified intervals (e.g. 1/30 sec.) during a period until an image of an object is recorded (photographing preparatory period). A state of the object is displayed on the LCD 6 substantially in real time by means of the live-view images, whereby a photographer can confirm the state of the object on the LCD 6.

In the still-image photographing mode, a photographing standby state where exposure control values (shutter speed and aperture value) and the like are set is set by pressing the shutter button 3 halfway. An exposing operation (exposing operation for recording) of the image pickup device 14 to generate an image of an object to be recorded in an external storage 21 (see FIG. 3) to be described later is started by fully pressing the shutter button 3. In the movie photographing mode, an exposing operation for recording is started by fully pressing the shutter button 3, and image data are cyclically obtained to generate images based thereon. The exposing operation for recording is stopped by fully pressing the shutter button 3 again.

The operation of pressing the shutter button 3 halfway is detected by an unillustrated switch S1 being turned on (S1: ON). The operation of fully pressing the shutter button 3 is detected by an unillustrated switch S2 being turned on (S2: ON). The shutter button 3 is one example of a switch as claimed.

The optical viewfinder 4 is arranged at a specified position on the rear surface of the apparatus main body 1A for optically displaying a range within which an object is to be photographed. The flash device 5 (built-in flash device) is arranged at an upper middle part of the front surface of the apparatus main body 1A for illuminating the object with light by letting an unillustrated discharge lamp discharge in the case where a light amount from the object is insufficient.

The LCD 6 is arranged substantially in the center of the rear surface of the apparatus main body 1A and includes a color liquid crystal panel. The LCD 6 is for displaying images picked up by the image pickup device 14, reproducing and displaying recorded images, and displaying setting screen used to set functions and modes provided in the image pickup apparatus 1.

The functional switches 7 are arranged at the right side of the LCD 6 and include a zoom switch for driving the zoom lens group 12 (see FIG. 3) in wide-angle direction or telephoto direction and a focusing switch for focus adjustment (driving the focusing lens group 13 along an optical-axis direction).

The power button 8 is arranged at the left side of the functional switches 7 on the rear surface of the apparatus main body 1A, and a main power supply is alternately turned on and off every time the power button 8 is pressed.

The mode setting switch 9 is arranged at an upper part of the rear surface of the apparatus main body 1A for switching the mode among the "still-image photographing mode" for photographing a still image of an object, the "movie photographing mode" for photographing moving images of an object, and a "reproduction mode" for reproducing and displaying a photographed image recorded in the external storage 21 (see FIG. 3) to be described later on the LCD 6. The mode setting switch 9 is a slide switch having three contacts and slidable along vertical direction, wherein the image pickup apparatus 1 is set to the reproduction mode when the switch 9 is set to a bottom position, to the still-image photographing mode when the switch 9 is set to a middle position and to the movie photographing mode when the switch 9 is set to an upper position.

The shake detecting sensor 10 is built in a specified position of the apparatus main body 1A and includes an X-sensor 10a for detecting the shake of the apparatus along X-axis direction and a Y-sensor for detecting the shake of the apparatus along Y-axis direction, assuming a two-dimensional coordinate system in which an X-axis extends in horizontal direction of FIG. 1 and a Y-axis extends in a direction perpendicular to the X-axis. The X-sensor 10a and the Y-sensor 10b are, for example, constructed by gyroscopes using piezoelectric elements, and adapted to detect angular velocities of the shake in the respective directions.

Figure 3:
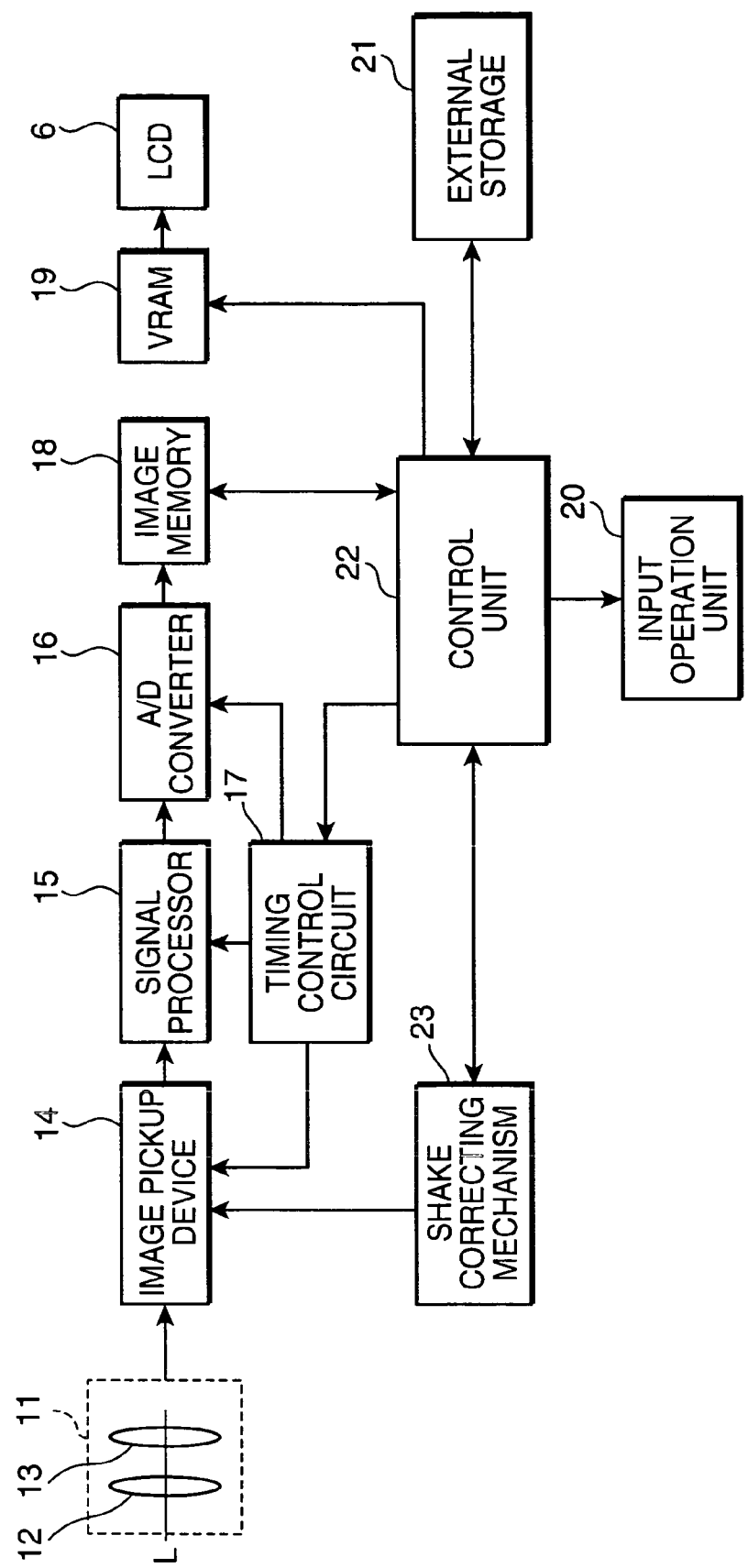
FIG. 3 is a block diagram showing the electrical construction of the image pickup apparatus.

Next, with reference to FIG. 3, the electrical construction of the image pickup apparatus 1 is described. It should be noted that the same members and the like as those in FIGS. 1 and 2 are identified by the same reference numerals.

An LCD 6 corresponds to the LCD 6 shown in FIG. 2, and a photographing optical system 2 includes a zoom lens group 12 and a focusing lens group 13.

An image pickup device 14 is arranged such that a light receiving surface thereof is normal to an optical axis of the photographing optical system 2 in an area at the rear side of the apparatus main body 1A. The image pickup device 14 is, for example, a CCD (charge coupled device) color area sensor having a Bayer array in which a plurality of photoelectric conversion elements such as photodiodes are two-dimensionally arranged in a matrix and color filters of, e.g. R (red), G (green), B (blue) having different spectral characteristics are arrayed at a ratio of 1:2:1 on light receiving surfaces of the respective photoelectric conversion elements. The image pickup device 14 is for converting a light image of an object focused by the photographing optical system 2 into analog electrical signals (image signals) of the respective color components R (red), G (green), B (blue) and outputting the resulting signals as image signals of the respective colors R, G, B.

An image pickup operation of the image pickup device 14 including the start and the end of an exposing operation of the image pickup device 14 and the readout of pixel signals of pixels of the image pickup device 14 (horizontal synchronization, vertical synchronization, transfer) is controlled by a timing control circuit 17 to be described later.

A signal processor 15 is for applying a specified analog signal processing to the analog image signals outputted from the image pickup device 14. The signal processor 15 includes a CDS (correlated double sampling) circuit and an AGC (automatic gain control) circuit, wherein noise of an image signal is reduced by the CDS circuit and the level thereof is adjusted by the AGC circuit.

An A/D (analog-to-digital) converter 16 is for converting analog pixel signals of R, G, B outputted from the signal processor 15 into digital pixel signals (hereinafter, "pixel data") each comprised of a plurality of bits (e.g. 10 bits). The timing control circuit 17 generates clocks CLK1, CLK2, CLK3 based on a reference clock CLK0 outputted from a control unit 22.

The timing control circuit 17 outputs the clock CLK1 to the image pickup device 14, the clock CLK2 to the signal processor 15, and the clock CLK3 to the A/D converter 16, thereby controlling the operations of the image pickup device 14, the signal processor 15 and the A/D converter 16.

An image memory 18 is a memory in which the image data outputted from the A/D converter 16 is temporarily saved and which is used as a work area for applying various processings to the image data by means of the control unit 22 in the photographing mode, and in which an image data read from the external storage 21 to be described later is temporarily saved in the reproduction mode.

A VRAM 19 has a memory capacity for an image signal corresponding to the number of pixels of the LCD 6 and serves as a buffer memory for the pixel data constituting an image to be reproduced and displayed on the LCD 6.

An input operation unit 20 includes the aforementioned shutter button 3, functional switches 7, power button 8 and mode setting switch 9, and is for entering operation information in the control unit 22. The external storage 21 is a memory card, a hard disk or the like and adapted to save images generated by the control unit 22.

The control unit 22 is a microcomputer having unillustrated built-in storages such as a ROM storing a control program and a flash memory for temporarily saving data, and centrally controls the photographing operation of the image pickup apparatus 1 by controlling the driving of the respective members in the aforementioned apparatus main body 1A in a coordinate manner.

In addition to the above construction, the image pickup apparatus 1 is provided with a so-called camera-shake correcting function to enable secure photographing in cases where "shake" such as camera shake is likely to occur during the photographing by a telephoto lens or of an object in the dark (requiring a longer exposure) with the apparatus 1 handheld. This camera-shake correcting function is such as to correct a displacement of an optical axis L by suitably moving (pivoting) the image pickup device 14 according to the shake when the image pickup apparatus 1 is shaken, for example, due to the hand shake of a user to displace the optical axis L.

A shake correcting mechanism 23 is for realizing the shake correcting function by driving the image pickup device 14 on a plane normal to the optical axis of the photographing optical system 2 according to the shake given to the image pickup apparatus 1 to correct a displacement of the optical axis L.

Figure 4A:
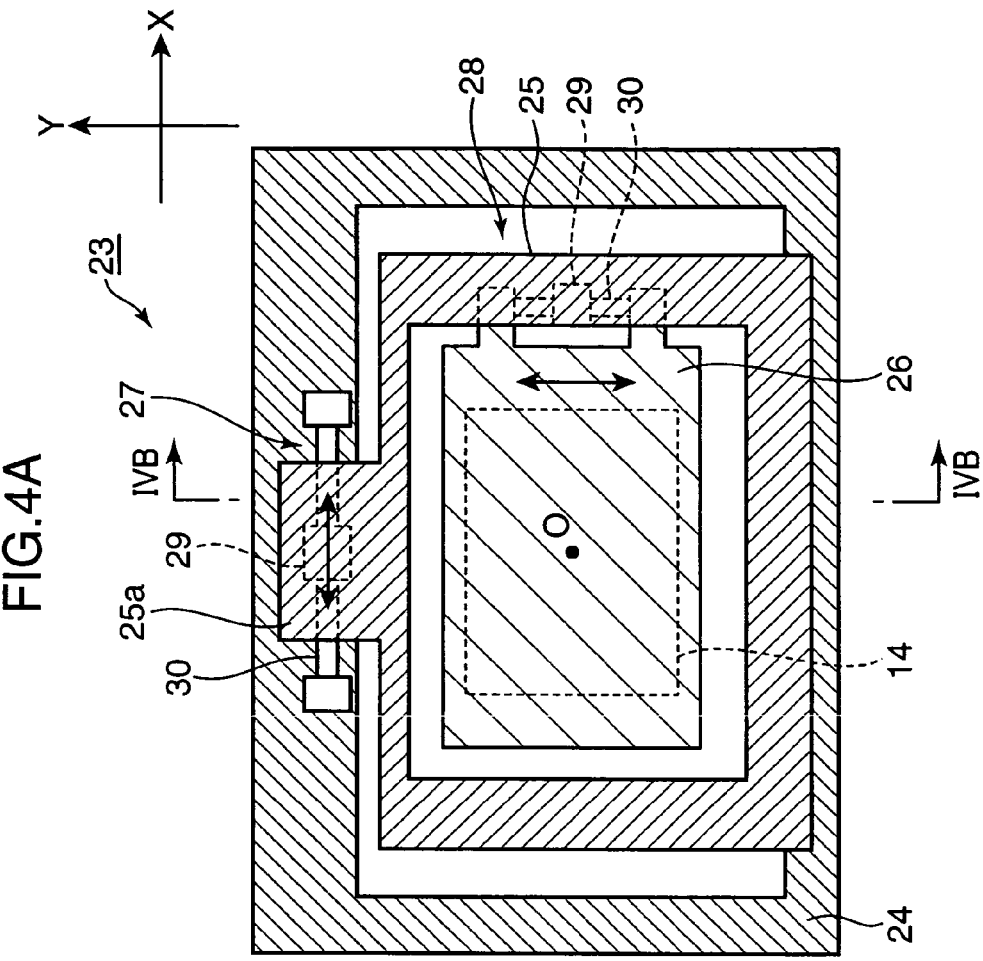
Figure 4B:
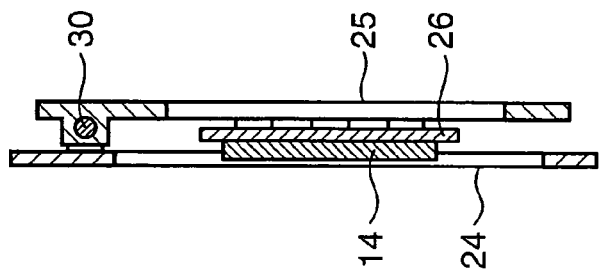

FIGS. 4A and 4B are diagrams showing one exemplary construction of the shake correcting mechanism 23, wherein FIG. 4A is a view seen from a side (rear side) opposite to an image pickup surface of the image pickup device 14 and FIG. 4B is a section along IVB-IVB of FIG. 4A. As shown in FIG. 4A, it is assumed that a two-dimensional coordinate system, in which an X-axis and a Y-axis defined in directions of longer and shorter sides are set for the image pickup surface of the image pickup device 14.

The shake correcting mechanism 23 includes a first base plate 24, a second base plate 25 and a third base plate 26, each of the plates 24 to 26 having a substantially rectangular shape, an X-axis actuator 27, and a Y-axis actuator 28. The first base plate 24 is a hollow member fixed to the apparatus main body 1A, and the X-axis actuator 27 is mounted at an upper middle position of the rear surface of the first base plate 24. The second base plate 25 is a hollow member coupled to the X-axis actuator 27. The Y-axis actuator 28 is mounted at a middle position of one lateral side of the front surface of the second base plate 25. The third base plate 26 is a plate-like member coupled to the Y-axis actuator 28. The image pickup device 14 is fixed to the front surface of the third base plate 26. It should be noted that the second and third base plates 25, 26 have movements thereof along X-axis direction and Y-axis direction guided at specified positions by unillustrated rail members.

The second base plate 25 has a projecting portion 25a projecting upward at a middle position of the upper edge, and a slider 29 is integrally formed on a surface of the projecting portion 25a toward the first base plate 24. The first base plate 24 and the second base plate 25 are coupled by frictional coupling between the slider 29 and a drive shaft 30 of the X-axis actuator 27, whereby the second base plate 25 is moveable along X-axis direction relative to the first base plate 24.

Further, a slider 29 is integrally formed at a middle position on a surface of one lateral side of the second base plate 25 toward the first base plate 24. The third base plate 26 and the second base plate 25 are coupled by frictional coupling between this slider 29 and a drive shaft 30 of the Y-axis actuator 28, whereby the third base plate 26 is movable along Y-axis direction relative to the second base plate 25.

By continuously applying specified drive pulses to the X-axis actuator 27 and the Y-axis actuator 28, the image pickup device 14 is moved along X-axis direction and Y-axis direction. The image pickup apparatus 1 detects an amount and a direction of the shake thereof by means of the shake detecting sensor 10, calculates a correction for the shake, and carries out the shake correcting operation based on this calculation result, using the shake correcting mechanism 23.

Figure 5:
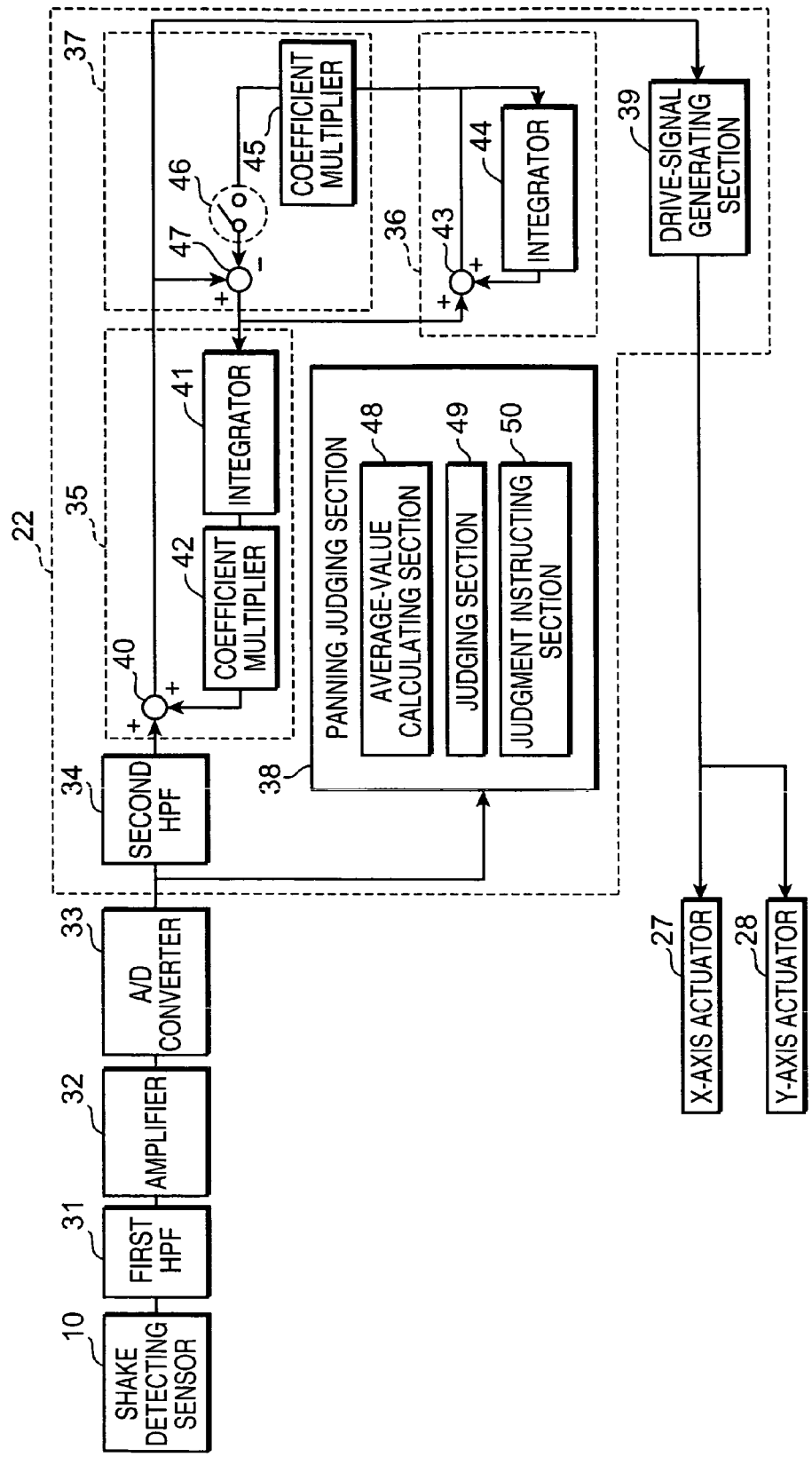
FIG. 5 is a block diagram showing the electrical construction relating to a shake correcting operation in the image pickup apparatus.

FIG. 5 is a block diagram showing the electrical construction relating to the shake correcting operation in the image pickup apparatus 1. As shown in FIG. 5, the image pickup apparatus 1 includes a shake detecting sensor 10, a first high-pass filter (hereinafter, "first HPF") 31, an amplifier 32, an A/D converter 33, and a control unit 22. The shake detecting sensor 10 of FIG. 5 corresponds to the one shown in FIG. 1.

The first HPF 31 is constructed, for example, by a capacitor and a resistance element and adapted to cut specified low-frequency components from an output signal of the shake detecting sensor 10. A cutoff frequency is set, for example, at 0.3 kHz. The first HPF 31 corresponds to a high-pass filter as claimed.

The amplifier 32 is for amplifying an output of the first HPF 31, and the A/D converter 33 is for converting an analog output signal of the amplifier 32 into a digital value.

The control unit 22 corresponds to the one shown in FIG. 3, and includes a second high-pass filter (hereinafter, "second HPF") 34, a first integrating section 35, a second integrating section 36, a correcting section 37, a panning judging section 38 and a drive-signal generating section 39. It should be noted that the operations of the A/D converter 33, the second HPF 34, the first integrating section 35, the second integrating section 36, the correcting section 37, the panning judging section 38, the drive-signal generating section 39 are triggered by the switch S1 being turned on. Accordingly, the substantial shake detecting operation is triggered by the switch S1 being turned on.

The second HPF 34 is for cutting low-frequency components and direct-current components of signals mainly created by characteristics of the amplifier 32 and the A/D converter 33 and the like. A cutoff frequency of the second HPF 34 is changeable, for example, from 0.9 kHz to 0.1 kHz.

The first integrating section 35 is for generating a shake angle signal based on an output of the second HPF 34 and outputting the generated signal to the drive-signal generating section 39, and is provided with an adder 40, an integrator 41 and a coefficient multiplier 42. The adder 40 is for adding an output of the second HPF 34 and an output of the coefficient multiplier 42.

The integrator 41 is for integrating outputs of the adder 40. As described later, the correcting section 37 includes a switch 46. Since no correcting operation is carried out by the correcting section 37 when the switch 46 is off, the integrator 41 has the outputs of the adder 40 inputted thereto as they are and integrates the outputs of the adder 40. On the other hand, when the switch 46 is on, the correcting operation is carried out by the correcting section 37 and the corrected outputs of the adder 40 are inputted to the integrator 41 to integrate the output values after the correction.

The coefficient multiplier 42 is for multiplying an output of the integrator 41 by a specified coefficient K and outputting the resulting product to the adder 40.

If it is assumed that X denotes an input value (output value of the integrator 41) to the coefficient multiplier 42 this time, K denotes a coefficient for multiplying the input value in the coefficient multiplier 42, and Y denotes an output value of the second HPF 34 (supposed to be constant), an output Z of the first integrating section 35 is a constant value when $X(1-K) = Y$.

The image pickup apparatus 1 of this embodiment is provided with the first HPF 31 constructed by a capacitor and a resistance element. Thus, when an output signal of the shake detecting sensor 10 come to contain relatively more direct-current components, for example, upon panning the image pickup apparatus 1, the first HPF 31 outputs a signal containing direct-current components and having an opposite sign.

Figure 6A:
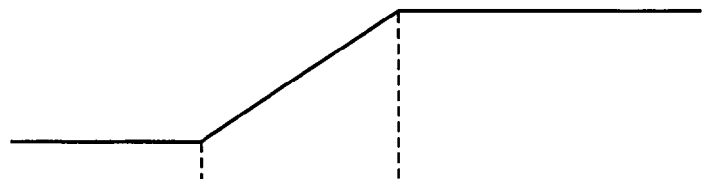
FIG. 6A is a graph showing a change in the rotating angle of the image pickup apparatus representing a panning operation of the image pickup apparatus.
Figure 6B:
FIG. 6B is a graph showing a change in the output of an angular velocity sensor in the case of the panning operation shown in FIG. 6A, and FIGS. 6C and 6D are graphs showing a change in the output of a first high-pass filter (HPF) in the case where the output shown in FIG. 6B is outputted from the angular velocity sensor.
Figure 6C:
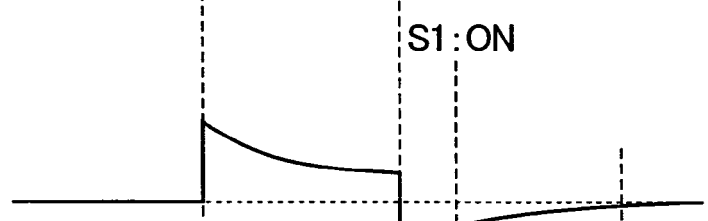

FIG. 6A is a graph showing a change in the rotation angle of the image pickup apparatus 1 representing a panning operation of the image pickup apparatus 1, FIG. 6B is a graph showing a change in the output of the shake detecting sensor 10 in the case of the panning operation shown in FIG. 6A, and FIG. 6C is a graph showing a change in the output of the first HPF 31 in the case where the output shown in FIG. 6B is outputted from the shake detecting sensor 10. These changes are with respect to time which is represented on the horizontal axis. Also, it should be noted that no influence of the shake given to the image pickup apparatus 1 is shown in FIGS. 6A to 6C.

In the case of such a panning operation as to increase the rotation angle of the image pickup apparatus 1 at a constant rate during a period between time T=t1 and time t2 as shown in FIG. 6A, the shake detecting sensor 10 outputs a constant output value between time T=t1 and time t2.

When an output having a waveform as shown in the graph of FIG. 6B is given from the shake detecting sensor 10, the output of the first HPF 31 gradually decreases till time T=t2 after instantaneously rising at time T=t1 as shown in FIG. 6C. Waveforms of outputs of the respective velocity sensors from time T=t1 to time t2 are determined by a time constant based on the capacity of the capacitor and the resistant vale of the resistance element provided in the first HPF 31.

The output of the first HPF 31 gradually increases and consequently converges to a value (e.g. "0") before the panning operation (this convergence value is assumed to be α) after instantaneously falling to a value with an opposite sign at time T=t2 when the output of the shake detecting sensor 10 falls from a specified value to "0".

Here, there is assumed a case where the switch S1 is turned on (the shutter button 3 is pressed halfway), for example, at time T=t3 while the output of the first HPF 31 gradually increases as shown in FIG. 6C. Since the shake correcting operation is triggered by the switch S1 being turned on, a shake angle signal is generated by the integrator 41 while the output of the first HPF 31 takes a value with an opposite sign and different from the convergence value α as an initial value when the shake correcting operation is started at time T=t3.

Conventionally, a false signal (wrong shake angle signal) representing as if a panning operation were carried out has been generated despite the fact that the image pickup apparatus 1 is not actually panned at time T=t3. When the switch S2 is turned on (the shutter button 3 is fully pressed) while this false signal is generated, the shake correcting operation is carried out based on a wrong detection result (detected angle), thereby resulting in a reduction in the quality of a photographed image.

Accordingly, the image pickup apparatus 1 of this embodiment is provided with the second integrating section 36 and the correcting section 37 to be described below, and the output of the first integrating section 35 is corrected using the second integrating section 36 and the correcting section 37 if the image pickup apparatus 1 is panned. The second integrating section 36 includes an adder 43 and an integrator 44.

The adder 43 adds an output of the first integrating section 35 and an output of the integrator 44 when the switch 46 is off. Further, when the switch 46 is on, the adder 43 adds a corrected output of the first integrating section 35 by the correcting section 37 and the output of the integrator 44. The integrator 44 integrates outputs of the adder 43.

The correcting section 37 is for correcting the outputs of the first integrating section 35 using the outputs of the second integrating section 36, and includes a coefficient multiplier 45, the switch 46 and a subtracter 47.

The coefficient multiplier 45 is for multiplying the output of the second integrating section 36 by a specified coefficient (e.g. 1%). The switch 46 is for determining whether or not to carry out the correcting operation by the correcting section 37. The subtracter 47 outputs the output of the first integrating section 35 as it is to the integrator 41 of the first integrating section 35 when the switch 46 is off, and subtracts the output of the coefficient multiplier 45 in the correcting section 37 from the output of the first integrating section 35 and outputs a resulting difference to the integrator 41 of the first integrating section 35 when the switch 46 is on.

Figure 7:
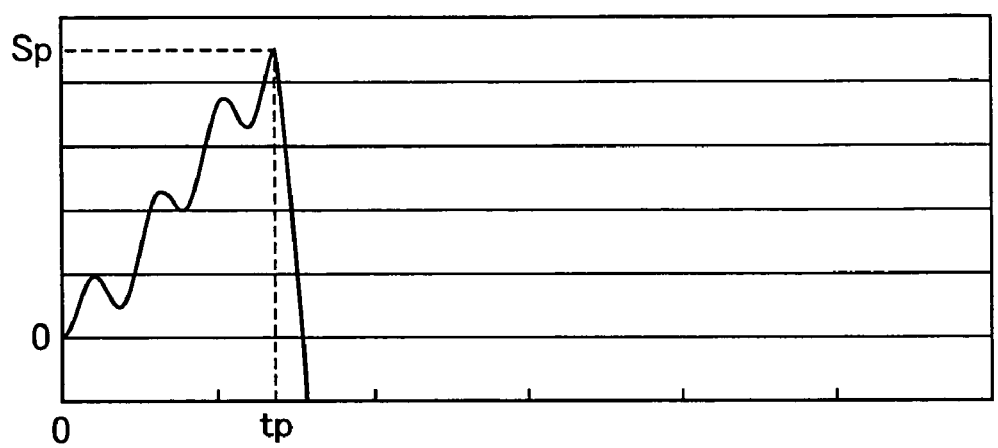
FIG. 7 is a graph showing a change in the output value of a second integrating section.

FIG. 7 is a graph showing a change in the output value of the second integrating section 36. As shown in FIG. 7, a waveform representing the output value of the second integrating section 36 is such as to increase as a whole, for example, if an average value of the outputs of the first integrating section 35 is positive. The cyclically recurrence of a period, during which the integral value temporarily decreases, in the output waveform shown in FIG. 7 indicates the presence of periods during which the output of the first integrating section 35 temporarily became negative.

If the switch 46 of the correcting section 37 is turned on at certain time tp while the output value of the second integrating section 36 is changing, a value (0.01×Sp) obtained by multiplying an integral value Sp at this point of time by the coefficient (1%) is set as a correction value. The output of the first integrating section 35 is corrected using this correction value. In other words, the correction value is subtracted from the output of the first integrating section 35 in the subtracter 47.

Effects of correcting the outputs of the first integrating section 35 using the second integrating section 36 and the correcting section 37 in this way are described below.

Figure 8A:
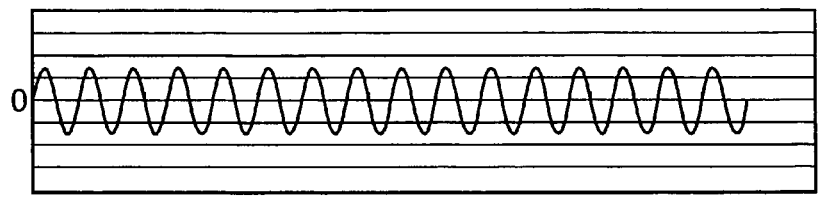
FIG. 8A is a graph showing a shake angle of shake given to the image pickup apparatus.
Figure 8B:
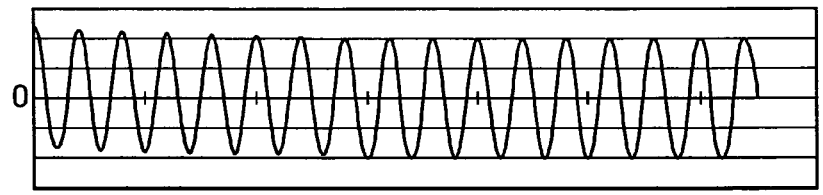
FIG. 8B is a graph showing the output of the first HPF.
Figure 8C:
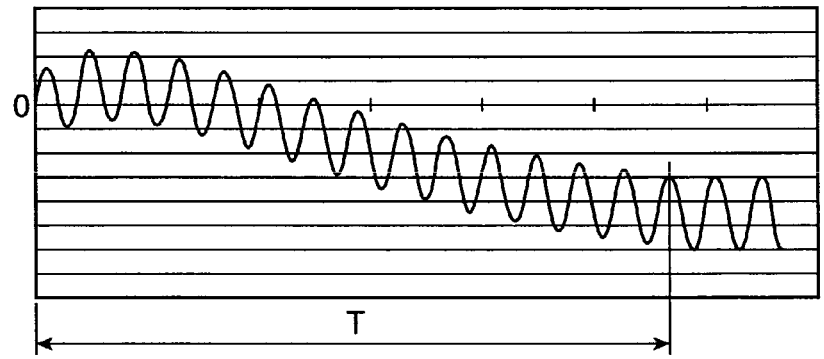
FIGS. 8C and 8D are graphs showing experimental results of the calculated shake angle.

FIG. 8A is a graph showing the shake angle of the shake given to the image pickup apparatus 1, FIG. 8B is a graph showing the output of the first HPF 31, and FIG. 8C is a graph showing an experimental result of shake angle calculated by the first integrating section 35 in the conventional construction (hereinafter, "calculated shake angle"). It should be noted that a horizontal axis represents time in the graphs shown in FIGS. 8A to 8C and an origin of the horizontal axis corresponds to time T=t3 in FIG. 6.

If it is assumed that such a shake as shown in FIG. 8A is given to the image pickup apparatus 1 after time T=t3, the waveform of the shake angle calculated by the first integrating section 35 is as shown in FIG. 8C. In other words, the waveform is such as to relatively largely change the center of amplitude over a relatively long period T and then to substantially stabilize after the lapse of the period T.

If the waveform of the shake angle calculated by the first integrating section 35 relatively largely changes over the relatively long period T in this way, a shake correction amount is calculated based on a detection result (calculated shake angle) different from actual shake if the switch S2 is turned on (the shutter button 3 is fully pressed) during this change. This leads to a wrong shake correcting operation, resulting in a problem of causing a reduction in the quality of a photographed image.

Accordingly, in this embodiment, the switch 46 of the correcting section 37 is turned on after the lapse of a specified period from a shake detection starting timing, and the output of the first integrating section 35 is corrected using the output of the second integrating section 36.

Figure 8D:
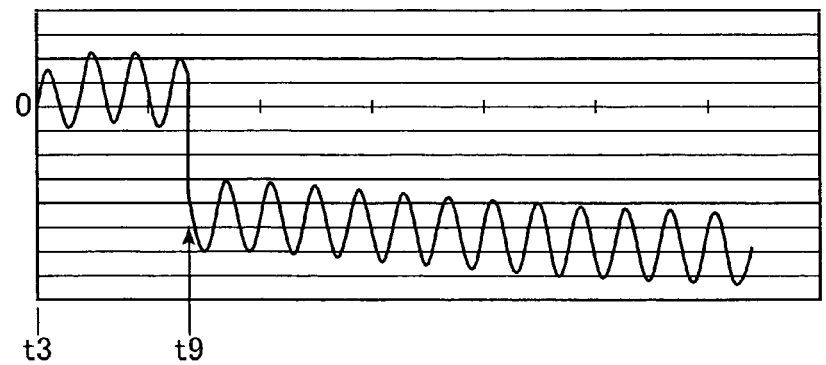

FIG. 8D is a graph showing an experimental result of the calculated shake angle in the case where the correcting operation by the correcting section 37 is carried out after the lapse of a specified period from the shake detection starting timing in the case where the shake shown in FIG. 8A is given to the image pickup apparatus 1. As shown in FIG. 8D, the calculated shake angle has such a waveform similar to the one shown in FIG. 8C until the switch 46 is turned on, and quickly stabilized within a specified range after instantaneously relatively largely decreasing (due to the addition of the correction value to the output of the first integrating section 35) at a timing (T=t9) when the switch 46 is turned on.

Thus, if the waveform of the calculated shake angle after the timing (T=t9) when the switch 46 is turned on is offset using a specified construction in such a way that the center of amplitude becomes substantially "0", a waveform approximate to the waveform (FIG. 8A) of the shake angle of the shake actually given to the image pickup apparatus 1 can be obtained. As a result, regardless of at which timing the switch S2 is turned on (the shutter button 3 is fully pressed), the shake correcting operation can be carried out based on the calculated shake angle true to the waveform of the shake angle of the shake actually given to the image pickup apparatus 1. Therefore, unlike the conventional practice, it can be prevented or suppressed to calculate a wrong correction amount based on the detection result different from the actual shake, wherefore a more precise shake correcting operation can be carried out.

In this embodiment, the timing at which the switch 46 of the correcting section 37 is turned on is set to be the one reached after the lapse of a specified period from the shake detection starting timing. This specified period is, for example, determined as follows.

Basically, as long as the image pickup apparatus 1 is faced in one specified direction, the specified period is preferred to be longer. However, the correction of the output of the first integrating section 35 needs to be completed before a photographing operation is started by the switch S2 being turned on. It may be thought to correct the output of the first integrating section 35 when the photographing operation is started by the switch S2 being turned on, but the processing becomes complicated in such a case since the specified period differs in each photographing operation and, accordingly, an optimal coefficient of the coefficient multiplier 45 also changes. Accordingly, the processing can be simplified if the specified period is a fixed period.

In a usual photographing operation, automatic focusing (AF) is started when the switch S1 is turned on, and an exposure operation is carried out when the switch S2 is turned on after confirming that the AF was completed. Accordingly, an upper limit value of the specified period is a time required for the AF of the image pickup apparatus 1. Further, a lower limit value for determining the specified period is a time required to obtain a camera-shake data of at least one wavelength of the waveform of a camera shake having a specified cycle (frequency), e.g. a camera shake having a longest cycle out of camera shakes supposed to be given to the image pickup apparatus 1. Then, the specified period is set within a range between the upper limit value and the lower limit value.

The reason for obtaining the camera-shake correction data at one wavelength is that the camera-shake data comprised of positive components and the camera-shake data comprised of negative components cancel each other by obtaining the camera-shake correction data at one wavelength, whereby a precise correction can be carried out by the correcting section 37. If the correction by the correcting section 37 is carried with the camera-shake correction data falling short of those at one wavelength, there is a high probability that the camera-shake data comprised of positive components and the camera-shake data comprised of negative components become unbalanced, with the result that the correction by the correcting section 37 becomes imprecise with a high probability. Further, the specified period is preferably set after the cutoff frequency of the second HPF 34 changes from an initial value (e.g. the above 0.9 kHz) to a final value (e.g. the above 0.1 kHz).

Referring back to FIG. 5, the panning judging section 38 judges whether or not the image pickup apparatus 1 is being panned based on an average value of outputs of the A/D converter 33, and includes an average-value calculating section 48, a judging section 49 and a judgment instructing section 50.

The average-value calculating section 48 is for calculating an average value of outputs of the A/D converter 33 at every interval of a specified period. The judging section 49 is for judging whether or not the image pickup apparatus 1 is being panned based on the average value calculated by the average-value calculating section 48. The average-value calculating section 48 and the judging section 49 construct a panning judging section as claimed.

FIG. 9A is a graph substantially similar to FIG. 6C, and FIG. 9B is a graph showing a change in the average value calculated by the average-value calculating section 48 in the case where the output of the first HPF 31 changes as shown in FIG. 9A.

As shown in FIGS. 9A and 9B, when the output of the first HPF 31 instantaneously rises at time T=t1, the average value calculated by the average-value calculating section 48 gradually increases from time T=t1, starts gradually decreasing at time T=t5 before time T=t2 from a gradually increasing state, and decreases suddenly at time T=t2. Then, the average value becomes below 0 at time T=t6 to have an opposite sign, and gradually increases to consequently become 0 after decreasing up to a certain value.

Here, when the image pickup apparatus 1 is panned, the above average value departs from a range defined between specified values Vth, −Vth in positive and negative domains. Thus, in this embodiment, the specified values Vth, −Vth are set as threshold values for judgment on the panning operation. Further, a timing at which the average value calculated by the average-value calculating section 48 becomes the threshold value Vth is judged to be a panning starting timing, and a timing at which the average value comes to have a sign opposite from the one at the start of the panning is judged to a panning ending timing. In other words, in FIG. 9B, time T=t7 is judged to be the panning starting time, and time T=t6 is judged to be the panning ending timing.

In this way, the timing at which the average value comes to have a sign opposite from the one at the start of the panning is judged to be the panning ending timing in this embodiment. Accordingly, the average value calculated by the average-value calculating section 48 also takes a value different from 0 for a while after time T=t6. If the panning operation is judged also during this period, the panning operation is erroneously judged to be present although no panning operation is actually carried out. As a result, the shake angle signal based on the average value calculated during this period is outputted from the first integrating section 35, whereby an erroneous shake correcting operation is carried out.

Accordingly, in this embodiment, a specified period from the panning ending timing is set as a panning judgment prohibiting period during which any judgment on the panning operation by the judging section 49 is prohibited, and the judgment processing on the presence or absence of the panning operation by the judging section 49 is prohibited during this period.

The judgment instructing section 50 is for prohibiting the judgment processing on the presence or absence of the panning operation by the judging section 49 during the specified period from the panning ending timing while causing the judging section 49 to carry out the judgment processing during other periods. It should be noted that the judgment instructing section 50 includes an unillustrated panning detection prohibition timer for measuring the specified period.

Figure 6D:
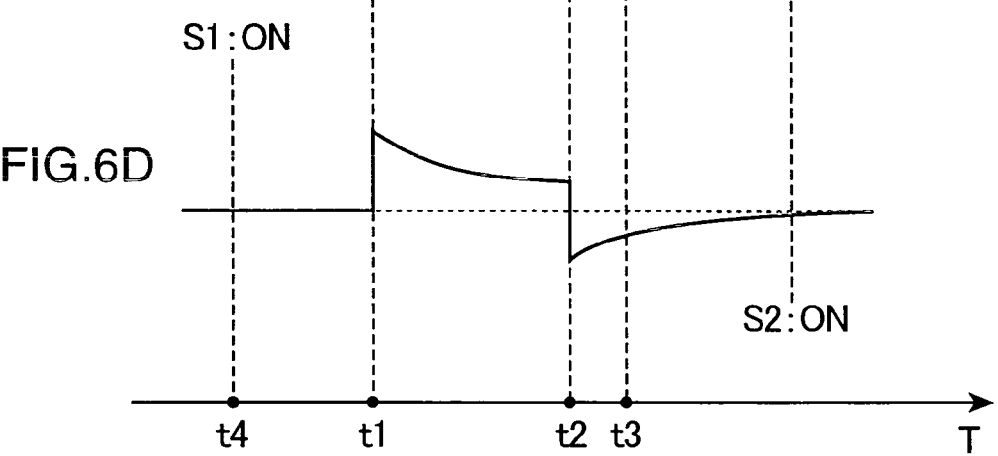

In this embodiment, the correcting operation by the correcting section 37 is carried out not only after the lapse of the specified period from the shake detection timing, but also at the following timing. FIG. 6D is a graph showing the output of the first HPF 31, assuming a case where the image pickup apparatus 1 is panned after the switch S1 is turned on. In the graph shown in FIG. 6D, the output waveform of the first HPF 31 is the same as in FIG. 6C and only the timing at which the switch S1 is turned on differs.

As shown in FIG. 6D, problems similar to those occurring when the switch S1 is turned on after the panning operation are thought to occur due to the waveform outputted from the first HPF 31 after the actual panning ending timing (time T=t2) also when the panning operation is carried out after the switch S1 is turned on (when the switch S1 is turned on at time T=t4 before time T=t1).

Accordingly, if the panning operation is carried out after the switch S1 is turned on, the switch 46 of the correcting section 37 is turned on to correct the output of the first integrating section 35 after the lapse of the specified period from the panning ending timing. In this case as well, the judgment processing on the presence or absence of the panning operation by the judging section 49 is prohibited during the specified period from the panning ending timing for the same reason as in the case where the switch S1 is turned on after the panning operation. It should be noted that the correcting section 37 includes an unillustrated correction timer for measuring the respective specified periods.

The drive-signal generating section 39 is for generating a drive signal used to drive the X-axis actuator 27 and Y-axis actuator 28 based on the shake angle signal outputted from the first integrating section 35. Specifically, the drive-signal generating section 39 generates a drive signal necessary to pivot the image pickup device 14 in such a manner as to follow up a control target value in order to execute a shake correction control (servo control) following up the control target value in accordance with a detection signal of the shake detecting sensor 10.

Figure 10:
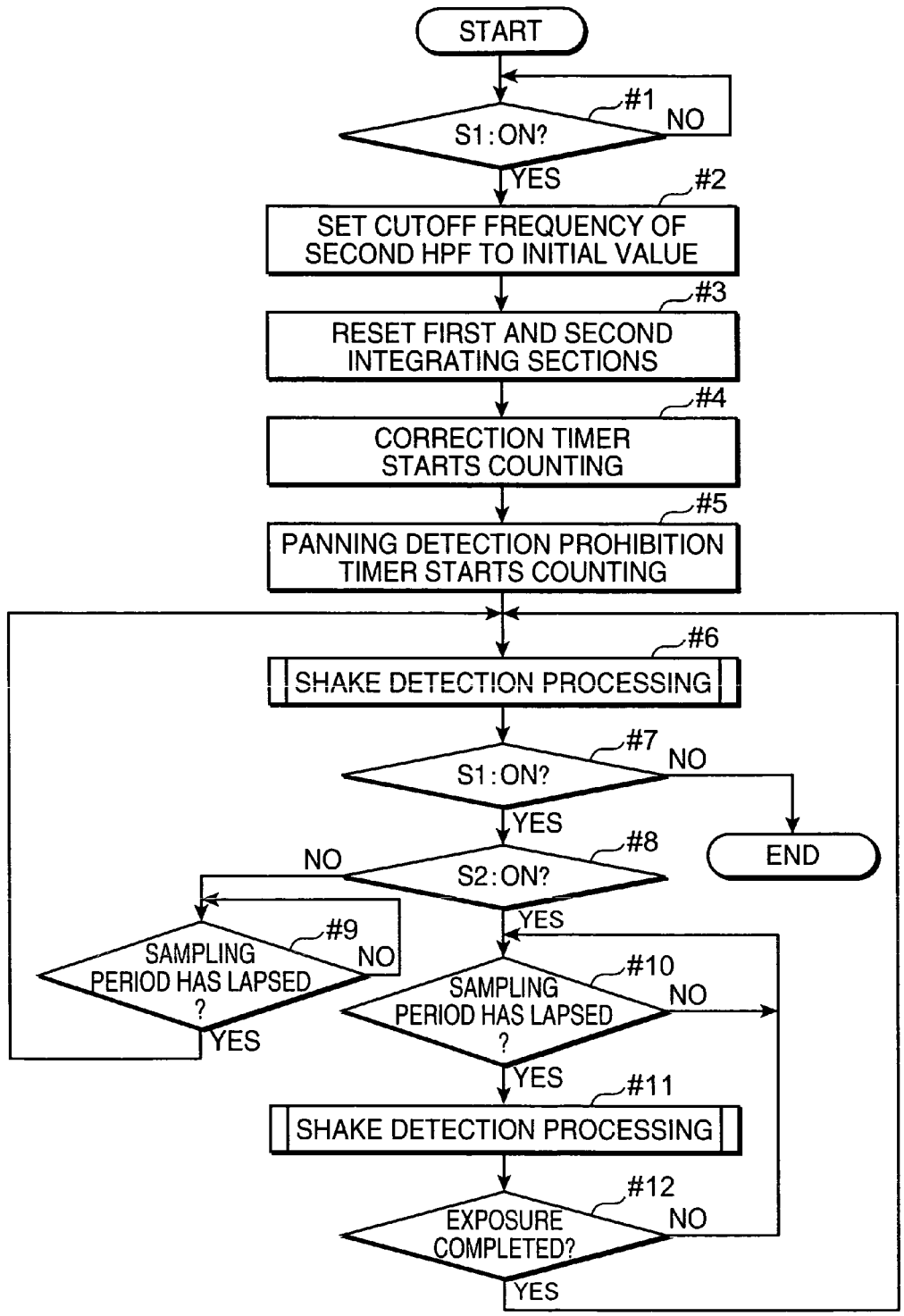
FIG. 10 is a flow chart showing a shake correction processing carried out in the image pickup apparatus.

FIG. 10 is a flow chart showing the shake correction processing in the image pickup apparatus 1. As shown in FIG. 10, when the shutter button 3 is pressed halfway to turn the switch S1 on (YES in Step #1), the second HPF 34 sets the cutoff frequency to a specified initial value (e.g. 0.9 kHz) (Step #2). The first and second integrating sections 35, 36 are reset (Step #3). Subsequently, the correction timer starts counting (Step #4) and the panning detection prohibition timer starts counting (Step #5).

Subsequently, the control unit 22 and the like carries out the shake detection processing to be described later (Step #6), a series of processings are completed if the switch S1 is not on (if the shutter button 3 is no longer pressed halfway) (NO in Step #7). On the other hand, if the switch S1 is still on (YES in Step #7), it is judged whether or not the switch S2 is on (whether or not a substantial exposing operation has been instructed by fully pressing the shutter button 3) (Step #8).

If the switch S2 is not on (NO in Step #8), the control unit 22 judges whether or not a sampling period (period of sampling the output of the shake detecting sensor 10, e.g. 2 kHz) has lapsed (Step #9). The control unit 22 waits on standby until the sampling period lapses if the sampling period has not lapsed yet (NO in Step #9). The control unit 22 returns to the processing in Step #6 after the sampling period lapses (YES in Step #9).

On the other hand, if the switch S2 is on in Step #8 (YES in Step #8), the control unit 22 judges whether or not the sampling period has lapsed (Step #10). The control unit 22 waits on standby until the sampling period lapses if the sampling period has not lapsed yet (NO in Step #10). When the sampling period lapses (YES in Step #10), the control unit 22 carried out a shake detection processing similar to the one in Step #6 (Step #11) and judges whether or not the exposing operation (exposing operation for recording) has been completed (Step #12).

This routine returns to Step #10 if the exposing operation is judged not to have been completed (NO in Step #12) while returning to Step #6 if the exposing operation has been completed (YES in Step #12).

Figure 11:
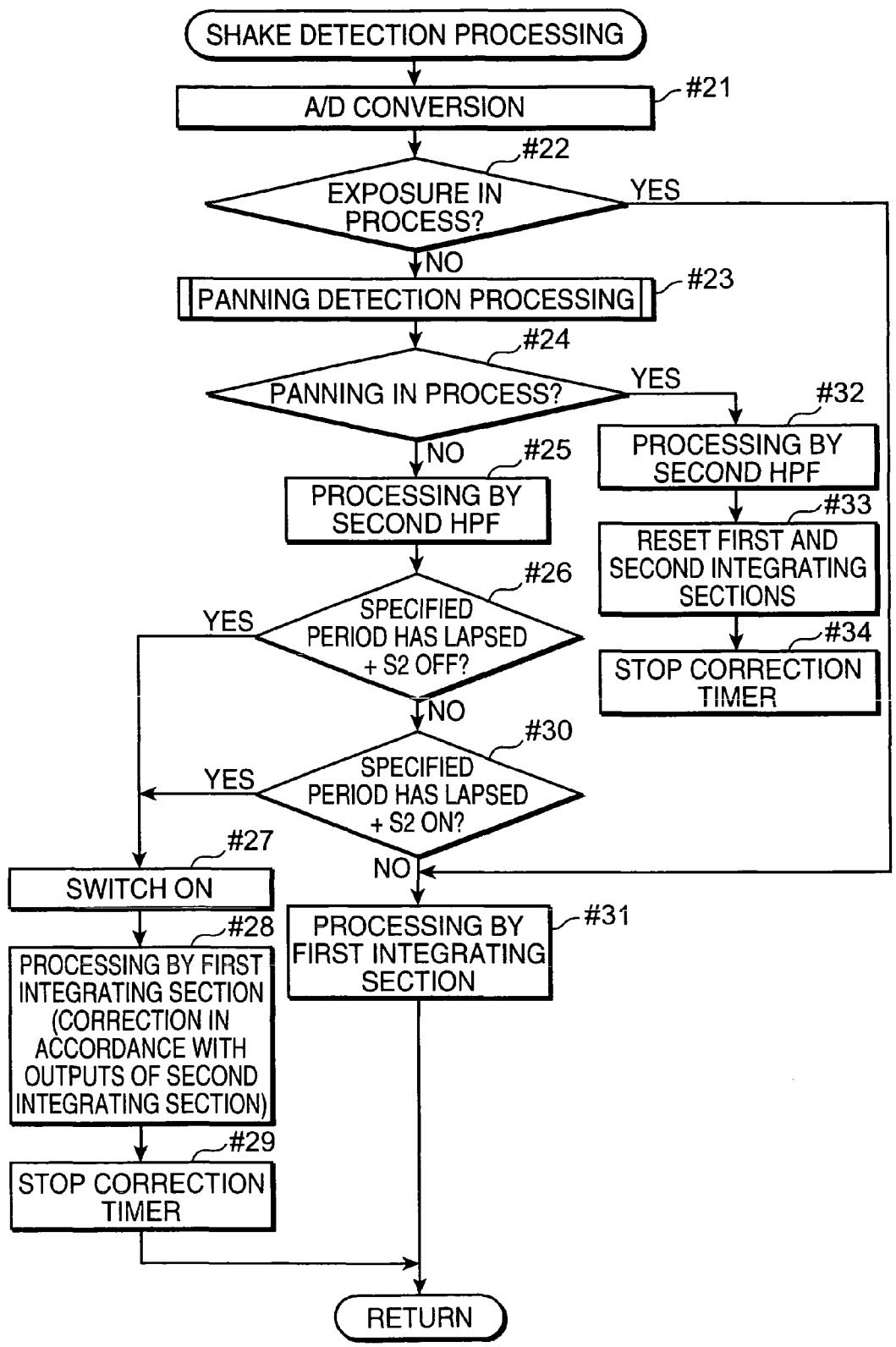
FIG. 11 is a flow chart showing a subroutine "shake detection processing" in Steps #6, #11 of FIG. 10.

FIG. 11 is a flow chart showing a subroutine "Shake Correction detection Processing" in Steps #6, #11 of FIG. 10. As shown in FIG. 11, the A/D converter 33 performs A/D conversion of the output of the amplifier 32 (Step #21) and judges whether or not the exposing operation (exposing operation for recording) is being carried out (Step #22). This subroutine proceeds to Step #31 if the exposing operation is being carried out (YES in Step #22), whereas the panning detection processing is carried out to detect whether or not the image pickup apparatus 1 is presently being panned (Step #23) unless the exposing operation is being carried out (NO in Step #22).

Figure 12:
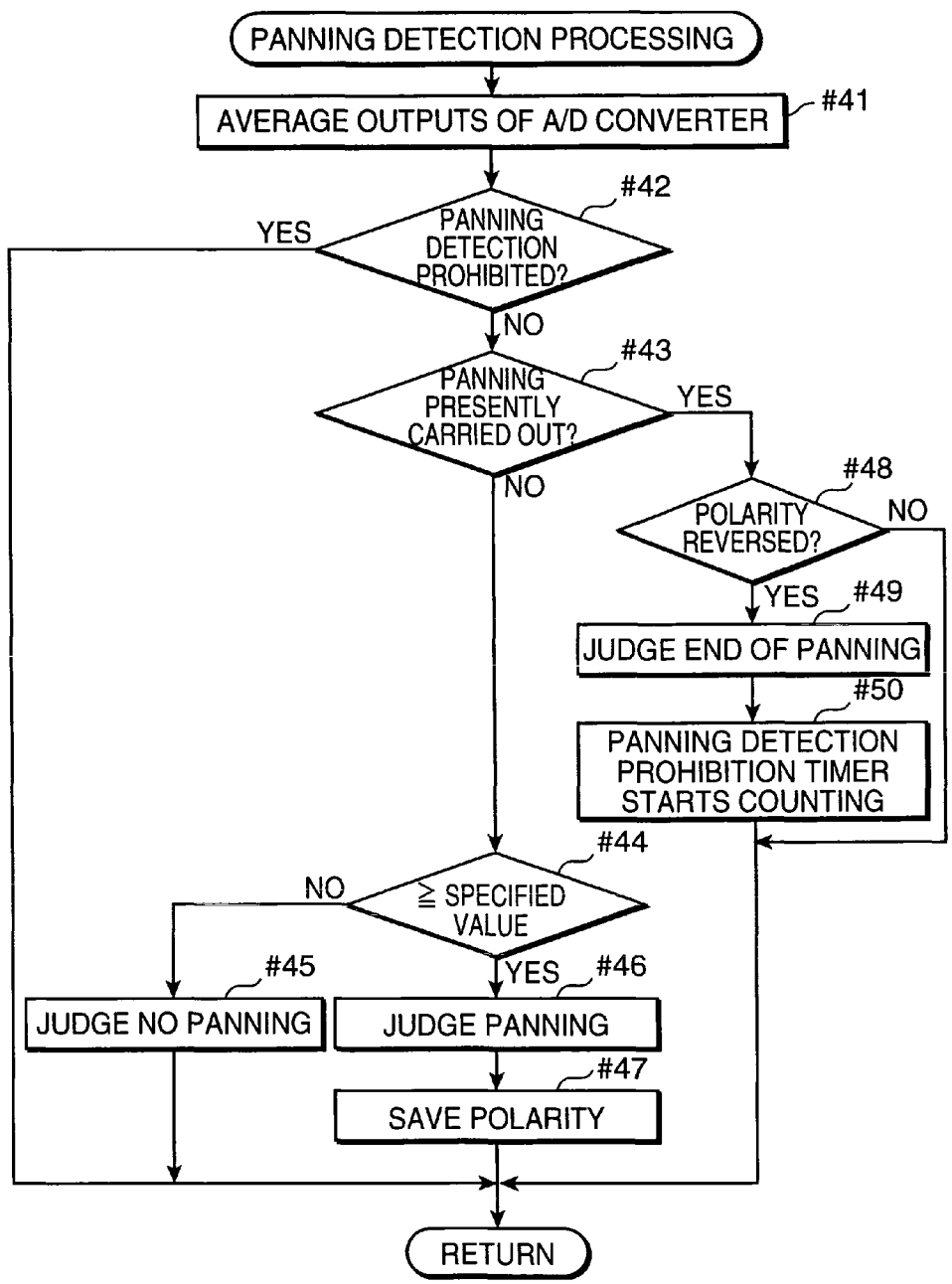
FIG. 12 is a flow chart showing a subroutine "panning detection processing" in Step #23 of FIG. 11.

FIG. 12 is a flow chart showing a subroutine "Panning Detection Processing" in Step #23 of FIG. 11. As shown in FIG. 12, the panning detecting section 38 calculates the average value of the outputs of the A/D converter 33 (Step #41) and judges whether or not the panning detection prohibiting period (e.g. 1 sec.) presently lapses (Step S42).

This subroutine proceeds to Step #24 of FIG. 11 if the panning detection prohibiting period is judged to presently lapse (YES in Step S42), whereas it is judged whether or not the panning operation is presently carried out (Step #43) unless the panning detection prohibiting period is judged to presently lapse (NO in Step S42). If the panning operation is judged not to be presently carried out (NO in Step #43), the control unit 22 judges whether or not the average value calculated in Step #41 is equal to or larger than a specified value (Step #44).

If the average value is judged to be below the specified value (NO in Step #44), the control unit 22 judges that the image pickup apparatus 1 is not being panned (Step #45) and proceeds to Step #24 of FIG. 11.

On the other hand, if the average value is equal to or larger than the specified value (corresponding to time T=t7 shown in FIG. 9) (YES in Step #44), the control unit 22 judges that the image pickup apparatus 1 has started being panned (Step #46), saves the polarity (positive or negative) of the output of the A/D converter 33 (Step #47) and proceeds to Step #24 of FIG. 11.

If the panning operation is judged to be presently carried out in Step #43 (YES in Step #43), the control unit 22 judges whether or not the polarity of the output of the A/D converter 33 has reversed at this moment (a state corresponding to time T=t6 shown in FIG. 9 has been reached) (Step #48).

If the polarity of the output of the A/D converter 33 is judged not to have been reversed (NO in Step #48), this subroutine proceeds to Step #24 of FIG. 11. On the other hand, if the polarity of the output of the A/D converter 33 has been reversed (if the state corresponding to time T=t6 shown in FIG. 9 has been reached) (YES in Step #48), the control unit 22 judges that the panning operation has been ended (Step #49). Then, after the panning detection prohibition timer starts counting (Step #50), this subroutine proceeds to Step #24 of FIG. 11.

Referring back to FIG. 11, the control unit 22 causes the second HPF 34 to cut specified low-frequency components (Step #25) if the image pickup apparatus 1 is judged not to be presently panned (including a case where the detection of the panning operation is prohibited) (NO in Step #24) as a result of the panning detection processing in Step #23. Here, the cutoff frequency of the second HPF 34 is gradually decreased within the range of, e.g. from 0.9 kHz to 0.1 kHz every time the processing in Step #25 is carried out until the switch S2 is turned on. This arrangement is made to cut signals containing many direct-current components immediately after the panning operation by setting a high cutoff frequency of the second HPF 34 at first and to avoid the continuation of a state where even signals necessary for the shake detection are removed by such a removing operation by gradually decreasing the cutoff frequency of the second HPF 34.

Subsequently, it is judged whether or not the specified period has lapsed from the shake detection starting timing (whether or not the correction timer has counted a count value corresponding to the specified period) and the switch S2 is presently off (Step #26). If the specified period has lapsed from the shake detection starting timing and the switch S2 is presently off (YES in Step #26), the switch 46 is turned on (Step #27), and the first integrating section 35 integrates the outputs of the second HPF 34 (Step #28) and stops the correction timer (Step #29). Since the switch 46 is on in Step #28, the output of the first integrating section 35 is corrected by the calculating section 37, using the output of the second integrating section 36, thereby being corrected based on the output of the second integrating section 36.

As a result, even if signals containing many direct-current components are outputted from the shake detecting sensor 10 by panning the image pickup apparatus 1, a sinusoidal output waveform having a substantially constant center of amplitude as shown in FIG. 8D can be obtained by the above correction.

On the other hand, unless the specified period has lapsed from the shake detection starting timing and the switch S2 is present off in Step #26 (NO in Step #26), it is judged whether or not the specified period has not yet lapsed from the shake detection starting time and the switch S2 is presently on (Step #30).

If the specified period has not yet lapsed from the shake detection starting time and the switch S2 is presently on (YES in Step #30), the processings in Steps #27 to #29 are carried out. On the other hand, if the specified period has not yet lapsed from the shake detection starting time and the switch S2 is not presently on (NO in Step #30), the first integrating section 35 integrates the outputs of the second HPF 34 (Step #31). The integration here is for merely integrating the outputs of the second HPF 34 since the switch 46 is off and the correction processing by the calculating section 37 using the outputs of the second integrating section 36 is not carried out.

If the image pickup apparatus 1 is judged to be presently panned (YES in Step #24) as a result of the panning detection processing in Step #23, the second HPF 34 cuts output signals containing specified low-frequency components (Step #32) and the correction timer is stopped (Step #34) after the first and second integrating sections 35, 36 are reset (Step #33). The cutoff frequency in Step #32 is fixed, for example, to 0.9 kHz.

A case where the panning operation of the image pickup apparatus 1 is ended corresponds to a case of the negative judgment result in Step #24, and the processings in Steps #25 to #31 are carried out while the panning detection prohibition timer measures the "specified period" of Steps #26, #30.

As described above, the outputs of the first integrating section 35 are corrected using the outputs of the second integrating section 36 after the lapse of the specified period from the shake detection starting timing and after the lapse of the specified period from the timing at which the panning operation of the image pickup apparatus 1 is judged to have been ended. Thus, even if signals containing many direct-current components are outputted from the shake detecting sensor 10 by panning the image pickup apparatus 1, a sinusoidal output waveform having a substantially constant center of amplitude as shown in FIG. 8D can be obtained after the above correction (after time T=t9).

As a result, if the waveform after the above correction timing is offset using a specified construction in such a way that the center of amplitude becomes substantially "0", a waveform approximate to that of the shake angle of the shake actually given to the image pickup apparatus 1 can be obtained. Thus, a reduction in the shake correction performance caused by providing the first HPF 31 can be prevented or suppressed, wherefore a photographed image of a high quality having no or less blurring can be obtained.

If the panning operation is carried out before or after the switch S1 is turned on, the correction processing may be carried out after the lapse of a specified period from a timing at which the panning operation is judged to have been ended.

Further, the panning detection is prohibited until the lapse of the specified period from the shake detection starting timing and until the lapse of the specified period from the timing at which the panning detection is judged to have been ended. This can prevent an erroneous shake correction resulting from the output of such a false signal representing as if the panning operation were being carried out although it is actually not carried out. In the normal photographing operation, a bad influence caused by prohibiting the detection of the panning operation is thought to hardly exist since a framing operation (operation of determining a photographing object to be covered by a photographing range) is already completed and the image pickup apparatus 1 is presumed to be substantially stationary when the switch S1 is turned on.

Figure 13A:
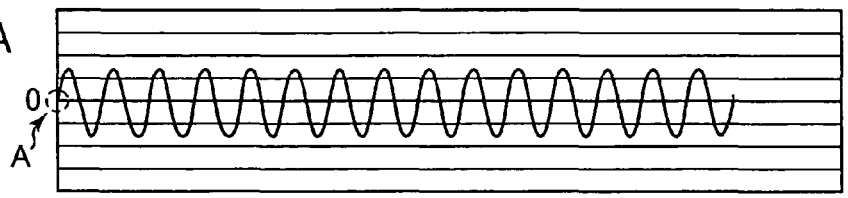
FIG. 13A is a graph showing a shake angle of shake given to an image pickup apparatus having a conventional construction in the case where a shake detecting operation is started at a timing when the image pickup apparatus is located in the center of the shake.
Figure 13B:
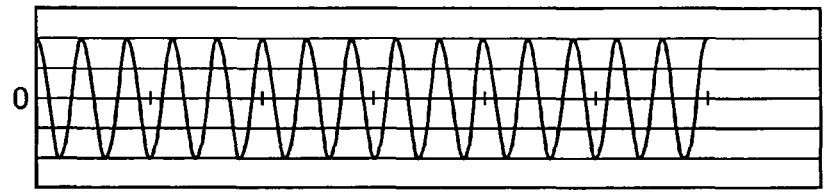
FIG. 13B is a graph showing the output of a first HPF.

The following effects can also be obtained according to this embodiment. FIG. 13A is a graph showing a shake angle of shake given to the image pickup apparatus 1 having a conventional construction in the case where a shake detecting operation is started at a timing when the image pickup apparatus 1 is located in the center of the shake (center of amplitude caused by the shake), FIG. 13B is a graph showing the output of the first HPF 31, FIG. 13C is a graph showing an experimental result of a shake angle calculated by the first integrating section 35 (hereinafter, "calculated shake angle"), FIG. 13D is a graph showing a shake angle of shake given to the image pickup apparatus 1 when the shake detecting operation is started at a timing when the image pickup apparatus 1 is located at a position (end of amplitude caused by the shake) where angular velocity is minimum, FIG. 13E is a graph showing the output of the first HPF 31 and FIG. 13F is a graph showing an experimental result of the calculated shake angle.

Figure 13C:
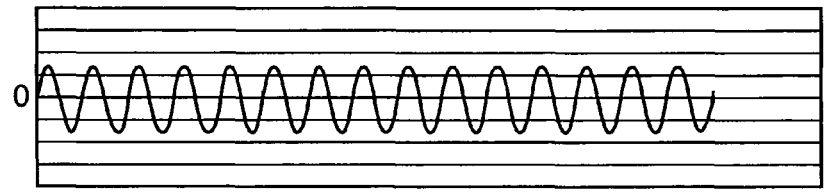
FIG. 13C is a graph showing an experimental result of the calculated shake angle.
Figure 13D:
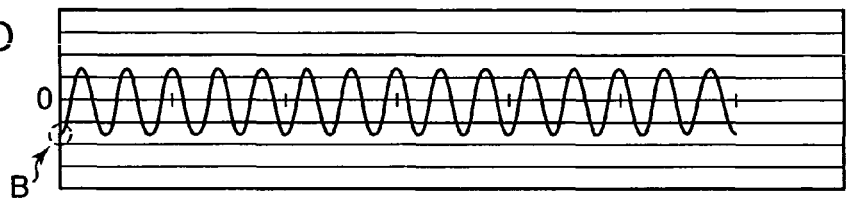
FIG. 13D is a graph showing a shake angle of shake given to the image pickup apparatus when the shake detecting operation is started at a timing when the image pickup apparatus is located at a position where angular velocity is minimum.
Figure 13E:
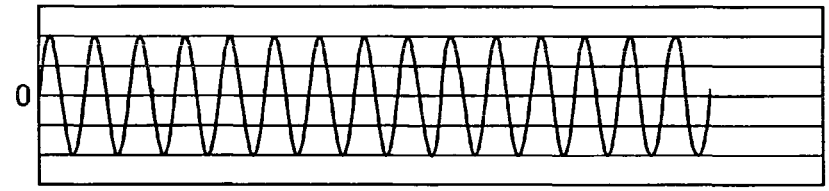
FIG. 13E is a graph showing the output of the first HPF and FIG. 13F is a graph showing an experimental result of the calculated shake angle.
Figure 13F:
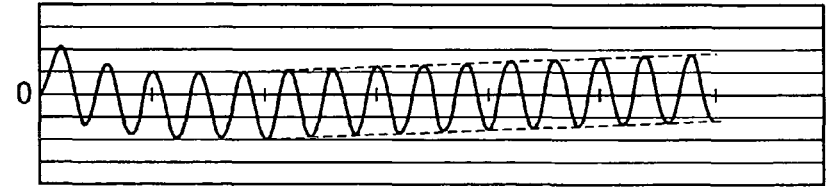
Figure 14A:
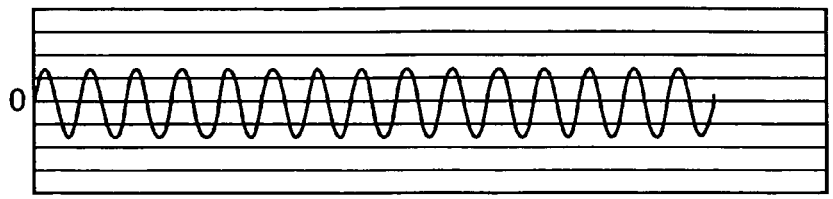
FIG. 14A is a graph showing a shake angle of shake given to an image pickup apparatus having an inventive construction in the case where a shake detecting operation is started at a timing when the image pickup apparatus is located in the center of the shake.
Figure 14B:
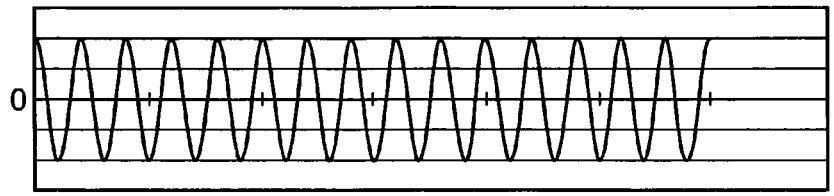
FIG. 14B is a graph showing the output of a first HPF.
Figure 14C:
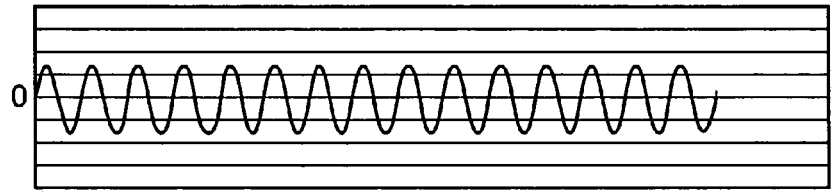
FIG. 14C is a graph showing an experimental result of the calculated shake angle.
Figure 14D:
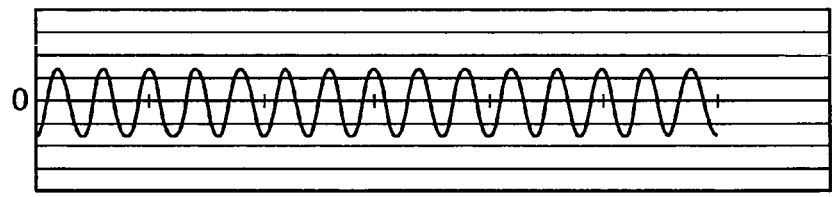
FIG. 14D is a graph showing a shake angle of shake given to the image pickup apparatus in the case where the shake detecting operation is started at a timing when the image pickup apparatus is located at a position where angular velocity is minimum.
Figure 14E:
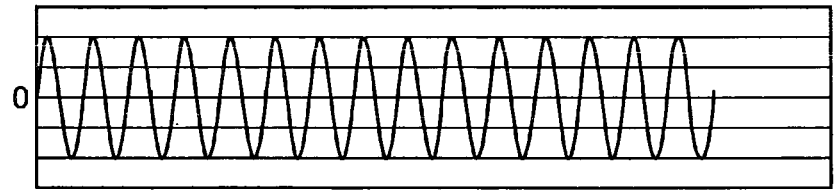
FIG. 14E is a graph showing the output of the first HPF and FIG. 14F is a graph showing an experimental result of the calculated shake angle.
Figure 14F:
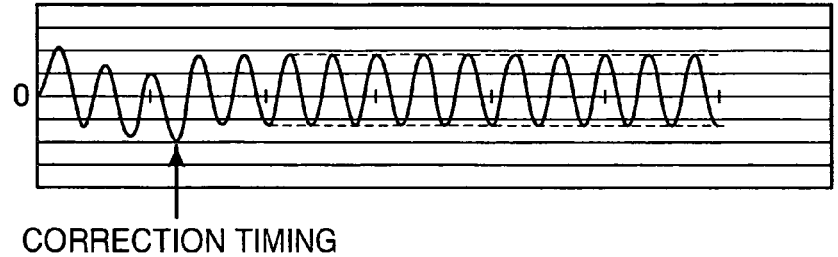

FIG. 14A is a graph (identical to FIG. 13A) showing a shake angle of shake given to the image pickup apparatus having the construction of this embodiment in the case where a shake detecting operation is started at a timing when the image pickup apparatus 1 is located in the center of the shake (center of amplitude caused by the shake), FIG. 14B is a graph showing the output of the first HPF 31, FIG. 14C is a graph showing an experimental result of a calculated shake angle, FIG. 14D is a graph showing a shake angle of shake given to the image pickup apparatus 1 when the shake detecting operation is started at a timing when the image pickup apparatus 1 is located at a position (end of amplitude caused by the shake) where angular velocity is minimum, FIG. 14E is a graph showing the output of the first HPF 31 and FIG. 14F is a graph showing an experimental result of the calculated shake angle. It should be noted that horizontal axes of the respective graphs shown in FIGS. 13 and 14 represent time.

As shown in FIG. 13C, in the conventional construction, the calculated shake angle stabilizes if the shake detecting operation is started at the timing when the image pickup apparatus 1 is located at a shake center position (center of amplitude caused by the shake, position indicated by arrow A), and the waveform substantially conforms to that (FIG. 13A) of the shake actually given to the image pickup apparatus 1. However, the calculated shake angle gradually changes (increases) as shown by dotted lines as shown in FIG. 13F if the shake detecting operation is started at the timing when the image pickup apparatus 1 is located at the position where the angular velocity is minimum (end of amplitude caused by the shake, position indicated by arrow B).

Contrary to this, in this embodiment, the calculated shake angular stabilizes if the shake detecting operation is started at the timing when the image pickup apparatus 1 is located at a shake center position (center of amplitude caused by the shake, position indicated by arrow A) as shown in FIG. 14C, and the waveform substantially conforms to that (FIG. 14A) of the shake actually given to the image pickup apparatus 1. Further, the calculated shake angle is substantially constant after a correction timing as shown in FIG. 14F even if the shake detecting operation is started at the timing when the image pickup apparatus 1 is located at the position where the angular velocity is minimum (end of amplitude caused by the shake), and the waveform substantially conforms to that (FIG. 14D) of the shake actually given to the image pickup apparatus 1.

In this way, signals of the stable calculated shake angle are outputted from the first integrating section 35 even if the phase of the shake of the image pickup apparatus 1 at the start of the shake detecting operation by the shake detecting sensor 10 differs, i.e. regardless of the phase of the shake of the image pickup apparatus 1 at the start of the shake detecting operation. As a result, the waveform of the calculated shake angle substantially conforming to that of the shake actually given to the image pickup apparatus 1 can be obtained.

When the correction of the outputs of the first integrating section 35 by the correcting section 37 using the outputs of the second integrating section 36 is started, the calculated shake angle becomes discontinuous immediately before and after the start of the correction. However, no particular problems occur if the calculated shake angle is used only in the shake correcting operation during the exposing operation for recording.

In addition to or in place of the above embodiment, the present invention may be embodied as in the following embodiments (1) to (5).

Figure 15:
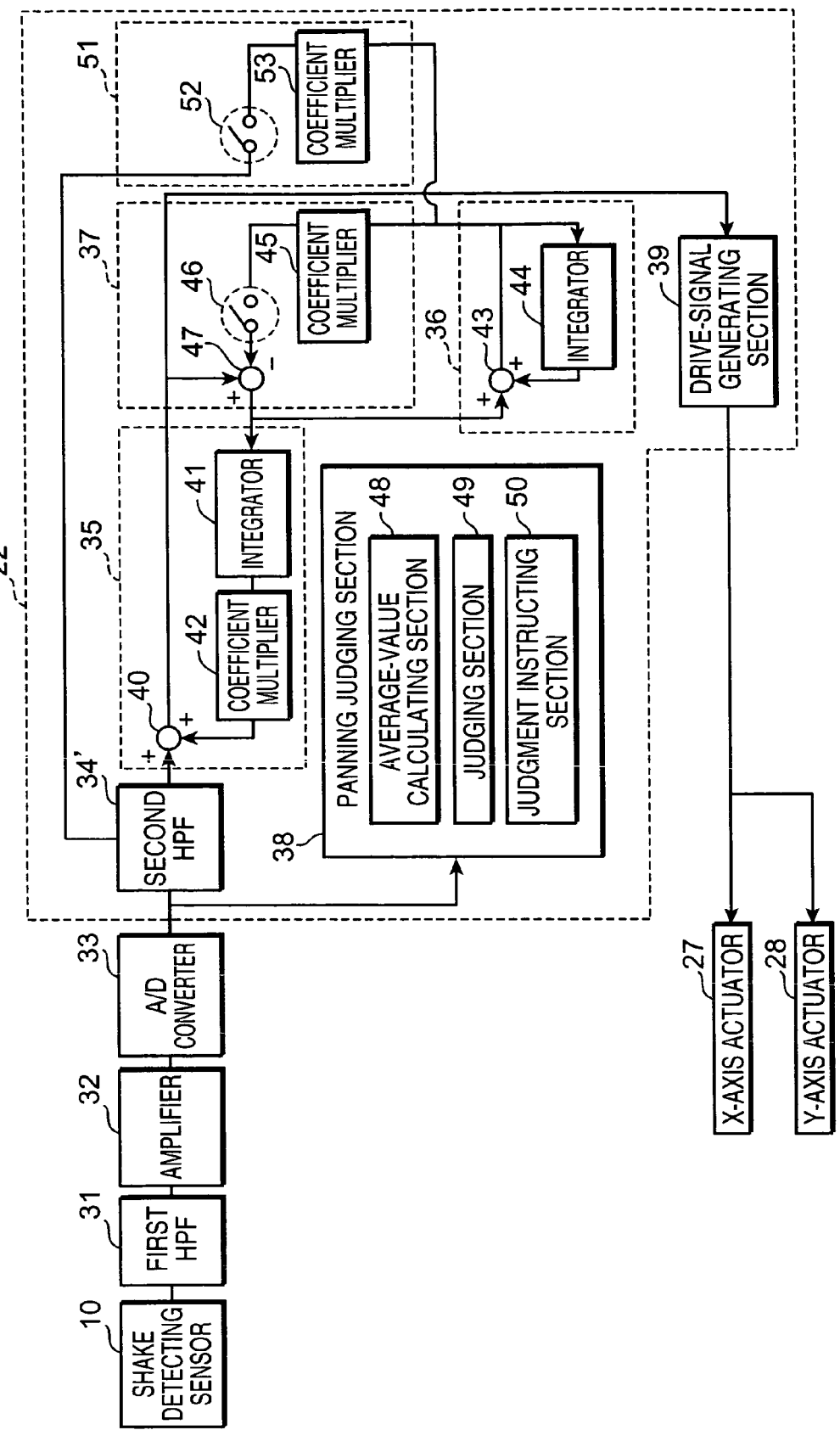
FIG. 15 is a block diagram showing a modification (1) of the electrical construction relating to the shake correcting operation.

(1) Although the outputs of the first integrating section 35 are corrected using the outputs of the second integrating section 35 in the first embodiment, the present invention is not limited thereto. The outputs of the second HPF 34 may be corrected based on the outputs of the second integrating section 36. FIG. 15 is a block diagram showing a modification of the electrical construction relating to the shake correcting operation. It should be noted that members and the like similar to those of the first embodiment are identified by same reference numerals and only points of difference from the first embodiment are described.

As shown in FIG. 15, the image pickup apparatus 1 of this embodiment differs from the first embodiment in that a control unit 22 includes a second correcting section 51. The second correcting section 51 is comprised of a switch 52 and a coefficient multiplier 53 and adapted to correct signals from a second HPF 34' using outputs of the second integrating section 36.

The switch 52 is turned on and off at the same timings as the switch 46 of the first correcting section 37. Specifically, the switch 52 is turned on after the lapse of a specified period from a shake detection starting timing, or after the lapse of a specified period from a panning ending timing if a panning operation is carried out after the switch S1 is turned on. The coefficient multiplier 53 is for multiplying the output of the second integrating section 36 by a specified coefficient.

Figure 16:
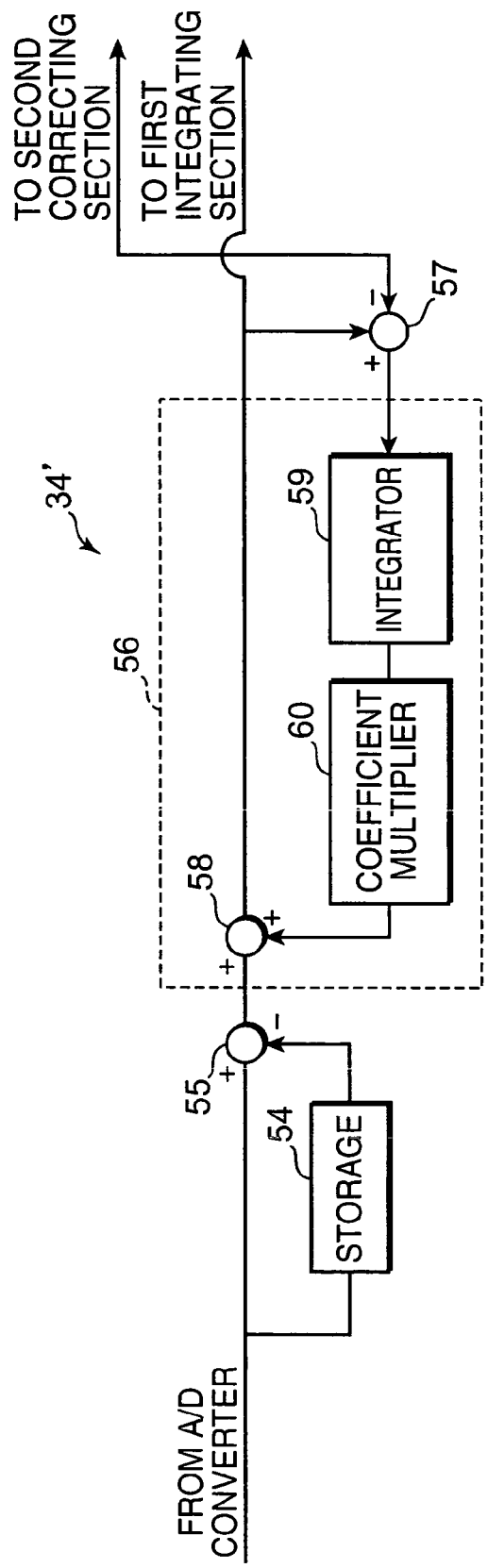
FIG. 16 is a block diagram showing the construction of a second HPF in the modification (1).

As a result of providing such a second correcting section 51, the second HPF 34' has a construction as shown in FIG. 16. As shown in FIG. 16, the second HPF 34' is comprised of a storage 54, a subtracter 55, an integrating section 56 and a subtracter 57.

The storage 54 is for temporarily saving an output of the A/D converter 33 last time. The subtracter 55 is for subtracting the output of the A/D converter 33 last time saved in the storage 54 from the output of the A/D converter 33 this time.

The integrating section 56 includes an adder 58, an integrator 59 and a coefficient multiplier 60. The adder 58 is for adding an output of the subtracter 55 and that of the coefficient multiplier 60. The integrator 59 is for integrating outputs of the adder 58. Since no correcting operation is carried out by the second correcting section 51 when the switch 52 of the second correcting section 51 is off, the outputs of the adder 58 are inputted as they are to the integrator 59 to be integrated. On the other hand, when the switch 52 is on, the correcting operation is carried out by the second correcting section 51, and the corrected outputs of the adder 58 are inputted to the integrator 59 to integrate the output values after the correction.

The coefficient multiplier 60 is for multiplying the output of the integrator 59 by a specified coefficient G equal to or below 1 and outputting the resulting product to the adder 58. The cutoff frequency of the second HPF 34' is a relatively small value (e.g. 0.1 kHz) when the coefficient G is a value close to 1 while being a relative large value (e.g. 0.9 kHz) when the coefficient G is a small value.

The subtracter 57 is for subtracting an output of the second correcting section 51 from an output of the adder 58 in the integrating section 56. In other words, the output of the integrating section 56 is corrected using the output of the second integrating section 36.

Even in the construction as above, similar to the first embodiment, the switch 52 of the second correcting section 51 is turned on after the lapse of the specified period from the shake detection starting timing or after the lapse of the specified period from a timing at which the panning operation of the image pickup apparatus 1 is judged to have been ended, and the outputs of the second HPF 34' can be corrected using outputs of the second integrating section 36. In this way, even if a signal containing many direct-current components is outputted from the shake detecting sensor 10 upon the panning operation of the image pickup apparatus 1, a reduction in the shake correction performance can be prevented or suppressed, wherefore a clear photographed image having no or less blurring can be obtained.

(2) In the first embodiment, the panning detection prohibiting period is specified to be a preset time starting from the timing at which the panning operation is judged to have been ended. The present invention is not limited thereto, and the panning detection prohibiting period may be specified based on a relationship between the output of the shake detecting sensor 10 and preset threshold values for the average value of the outputs of the shake detecting sensor 10. For example, the panning detection prohibiting period may be specified to be a period starting from the timing at which the panning operation is judged to have been ended to a timing at which the average value of the outputs of the shake detecting sensor 10 comes to lie within a specified range corresponding to the threshold values.

(3) It is already described above that the calculated shake angle becomes discontinuous immediately before and after the start of the correction when the correcting section 37 starts correcting the outputs of the first integrating section 35 using the outputs of the second integrating section 36. In order to deal with this problem, a processing unit comprised of the second HPF 34, the first integrating section 35 and the drive-signal generating section 39 may be provided separately from the respective sections in the control unit 22 shown FIG. 5, and the shake correcting operation may be carried out after the problem of discontinuity is solved by this processing unit if a photographed image is displayed, for example, using an EVF during a photographing preparatory period and the like in addition to the exposing operation for recording. Since the present invention is not applicable in such a case, it may be thought to generate a signal of a wrong calculated shake angle by the first HPF 31 outputting a signal containing direct-current components and having an opposite sign. Since image quality required for photographed images to be displayed at times other than the exposing operation for recording is lower than the one for an image obtained by the exposing operation for recording, there are no particular problems.

(4) Although the correction timing by the correcting section 37 is set to be after the lapse of the specified period from the shake detection starting timing in the first embodiment, the present invention is not limited thereto. The correction timing may be set to be after the lapse of a specified period from the ON-timing of the switch S1.

(5) The image pickup device 14 is not limited to the type that can be driven on a plane normal to the optical axis, and an image pickup device of the type that is provided with an optical system for shake correction and drives this optical system on a plane normal to an optical axis may also be adopted.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A shake detecting apparatus, comprising:
    a shake detecting sensor for outputting signals resulting from shake given to the shake detecting apparatus,
    a first integrating section for integrating the signals outputted from the shake detecting sensor,
    a second integrating section for integrating outputs of the first integrating section, and
    a correcting section for correcting the outputs of the first integrating section using outputs of the second integrating section after the lapse of a specified period from a specified timing, wherein:
    output signals from the second integrating section are inputted to the correcting section; and,
    signals corrected by the correcting section are inputted to the first integrating section.

2. A shake detecting apparatus according to claim 1, further comprising an input operating portion for inputting an instruction concerning the determination of a starting timing of a shake detecting operation by the shake detecting sensor, wherein the specified timing is a timing relating to an input timing of the instruction by means of the input operating portion.

3. A shake detecting apparatus according to claim 2, further comprising a panning judging section for detecting whether or not the shake detecting apparatus is being panned, wherein the detection of a panning operation by the panning judging section is prohibited during a period from the timing relating to the input timing of the instruction by means of the input operating portion to the lapse of a specified period.

4. A shake detecting apparatus according to claim 1, further comprising a panning judging section for detecting whether or not the shake detecting apparatus is being panned, wherein the specified timing is a timing relating to a timing detected to end a panning operation by the panning judging section.

5. A shake detecting apparatus according to claim 4, wherein the detection of the panning operation by the panning judging section is prohibited during a period until the lapse of a specified period from the timing relating to the timing detected to end the panning operation by the panning judging section.

6. A shake detecting apparatus according to claim 1, wherein the correcting section includes:
    a multiplier for multiplying an output of the second integrating section this time by a specified coefficient, and
    a subtracter for subtracting a product value obtained by the multiplication of the multiplier from an output of the first integrating section next time and outputting the obtained difference to the first integrating section.

7. A shake detecting apparatus according to claim 1, further comprising a high-pass filter for removing low-frequency components from an electrical signal inputted from the shake detecting sensor and outputting the resulting signal to the first integrating section.

8. A shake correcting apparatus, comprising:
    a photographing optical system for introducing an object image to an image pickup surface,
    a shake detecting sensor for outputting signals resulting from shake given to the shake correcting apparatus,
    a first integrating section for integrating the signals outputted from the shake detecting sensor,
    a second integrating section for integrating outputs of the first integrating section,
    a correcting section for correcting the outputs of the first integrating section using outputs of the second integrating section after the lapse of a specified period from a specified timing,
    a calculator for calculating a shake correction amount used to stabilize an optical axis of the photographing optical system based on the output of the first integrating section corrected by the correcting section, and
    an actuator for driving a shake correction object based on the calculated shake correction amount for the correction, wherein:

output signals from the second integrating section are inputted to the correcting section; and, signals corrected by the correcting section are inputted to the first integrating section.

9. A shake correcting apparatus according to claim 8, further comprising an input operating portion for inputting an instruction concerning the determination of a starting timing of a shake detecting operation by the shake detecting sensor, wherein the specified timing is a timing relating to an input timing of the instruction by means of the input operating portion.

10. A shake correcting apparatus according to claim 8, further comprising a panning judging section for detecting whether or not the shake correcting apparatus is being panned, wherein the specified timing is a timing relating to a timing detected to end a panning operation by the panning judging section.

11. A shake correcting apparatus according to claim 8, wherein the correcting section includes:

a multiplier for multiplying an output of the second integrating section this time by a specified coefficient, and a subtracter for subtracting a product value obtained by the multiplication of the multiplier from an output of the first integrating section next time and outputting the obtained difference to the first integrating section.

12. A shake correcting apparatus according to claim 8, further comprising a high-pass filter for removing low-frequency components from an electrical signal inputted from the shake detecting sensor and outputting the resulting signal to the first integrating section.

13. An image pickup apparatus, comprising:

an image pickup device, a photographing optical system for introducing an object image to the image pickup device, a shake detecting sensor for outputting signals resulting from shake given to the image pickup apparatus, a first integrating section for integrating the signals outputted from the shake detecting sensor, a second integrating section for integrating outputs of the first integrating section, a correcting section for correcting the outputs of the first integrating section using outputs of the second integrating section after the lapse of a specified period from a specified timing, a calculator for calculating a shake correction amount used to stabilize an optical axis of the photographing optical system based on the output of the first integrating section corrected by the correcting section, and an actuator for driving a shake correction object based on the calculated shake correction amount for the correction, wherein:

output signals from the second integrating section are inputted to the correcting section; and, signals corrected by the correcting section are inputted to the first integrating section.

14. An image pickup apparatus according to claim 13, further comprising a switch for inputting an instruction for setting the image pickup apparatus in an image-pickup standby state in response to an operation by an operator, wherein the specified timing is a timing at which the switch is turned on.

15. An image pickup apparatus according to claim 14, further comprising a panning judging section for detecting whether or not the image pickup apparatus is being panned, wherein the detection of a panning operation by the panning judging section is prohibited during a period until the lapse of a specified period after the switch is turned on.

16. An image pickup apparatus according to claim 13, further comprising a panning judging section for detecting whether or not the image pickup apparatus is being panned, wherein the specified timing is a timing relating to a timing detected to end a panning operation by the panning judging section.

17. An image pickup apparatus according to claim 16, wherein the detection of the panning operation by the panning judging section is prohibited during a period until the lapse of a specified period from the timing relating to the timing detected to end the panning operation by the panning judging section.

18. An image pickup apparatus according to claim 13, wherein the correcting section includes:

a multiplier for multiplying an output of the second integrating section this time by a specified coefficient, and a subtracter for subtracting a product value obtained by the multiplication of the multiplier from an output of the first integrating section next time and outputting the obtained difference to the first integrating section.

19. An image pickup apparatus according to claim 13, further comprising a high-pass filter for removing low-frequency components from an electrical signal inputted from the shake detecting sensor and outputting the resulting signal to the first integrating section.

* * * * *